(12) United States Patent
Furukawa et al.

(10) Patent No.: US 12,049,545 B2
(45) Date of Patent: Jul. 30, 2024

(54) UNCURED LAMINATE, REINFORCING FIBER COMPOSITE MATERIAL, METHOD FOR PRODUCING UNCURED LAMINATE, AND METHOD FOR PRODUCING REINFORCING FIBER COMPOSITE MATERIAL

(71) Applicant: KANEKA CORPORATION, Osaka (JP)

(72) Inventors: Yoshio Furukawa, Osaka (JP); Yutaka Kaneda, Osaka (JP)

(73) Assignee: KANEKA CORPORATION, Osaka (JP)

( * ) Notice: Subject to any disclaimer, the term of this patent is extended or adjusted under 35 U.S.C. 154(b) by 672 days.

(21) Appl. No.: 17/221,592

(22) Filed: Apr. 2, 2021

(65) Prior Publication Data

US 2021/0221113 A1    Jul. 22, 2021

Related U.S. Application Data

(63) Continuation of application No. PCT/JP2019/039108, filed on Oct. 3, 2019.

(30) Foreign Application Priority Data

Oct. 3, 2018 (JP) ................ 2018-188660

(51) Int. Cl.
  *C08J 5/04*      (2006.01)
  *B32B 5/02*      (2006.01)
  (Continued)

(52) U.S. Cl.
  CPC ............... *C08J 5/041* (2013.01); *B32B 5/024* (2013.01); *B32B 5/10* (2013.01); *B32B 5/263* (2021.05);
  (Continued)

(58) Field of Classification Search
  CPC ........ C08J 5/243; C08J 5/042; C08J 2379/08; C08J 2333/24; C08J 5/04; C08J 5/041;
  (Continued)

(56) References Cited

U.S. PATENT DOCUMENTS

| | | |
|---|---|---|
| 5,665,295 A | 9/1997 | Takamoto et al. |
| 2011/0165809 A1 | 7/2011 | Miyauchi et al. |

(Continued)

FOREIGN PATENT DOCUMENTS

| | | |
|---|---|---|
| JP | H08-276524 A | 10/1996 |
| JP | 2006-312700 A | 11/2006 |

(Continued)

OTHER PUBLICATIONS

International Preliminary Report on Patentability issued in corresponding International Application No. PCT/JP2019/039108 dated Apr. 15, 2021 (10 pages).

(Continued)

*Primary Examiner* — John D Freeman
(74) *Attorney, Agent, or Firm* — Osha Bergman Watanabe & Burton LLP

(57) ABSTRACT

A layered body which allows a reduction in residual volatile component and a method for producing the layered body. A reinforcing fiber composite material which has high heat resistance and superior mechanical strength and a method for producing the reinforcing fiber composite material. A method includes fusing together a plurality of layers each of which contains: a powder of an imide oligomer represented by a specific general formula; and reinforcement fibers.

13 Claims, 1 Drawing Sheet

(51) Int. Cl.
   *B32B 5/10*     (2006.01)
   *B32B 5/26*     (2006.01)
   *B32B 27/28*    (2006.01)
   *C08J 5/24*     (2006.01)

(52) U.S. Cl.
   CPC ............. *B32B 27/281* (2013.01); *C08J 5/042* (2013.01); *C08J 5/243* (2021.05); *B32B 2250/05* (2013.01); *B32B 2260/023* (2013.01); *B32B 2260/046* (2013.01); *B32B 2262/106* (2013.01); *B32B 2307/306* (2013.01); *B32B 2605/00* (2013.01); *B32B 2605/18* (2013.01); *C08J 2379/08* (2013.01)

(58) Field of Classification Search
   CPC ................ B32B 5/26; B32B 2260/023; B32B 2260/046; B32B 2262/106; B32B 2262/101; B32B 5/026; B32B 2262/0261; B32B 2262/103; B32B 2262/105; B32B 2307/542; B32B 2307/558; B32B 2605/18; B32B 5/02; B32B 5/024; B32B 27/20; B32B 2305/076; B32B 5/10; B32B 5/263; B32B 27/281; B32B 2250/05; B32B 2307/306; B32B 2605/00; B32B 2262/02; B32B 2262/14; B32B 2307/718; B32B 5/022; B32B 5/08; B32B 2250/20; B32B 2262/0253; B32B 3/12; B32B 5/028; B32B 2262/0276; B32B 2603/00; C08G 73/1071; C08G 69/26; C08G 73/1028; B29C 70/025

See application file for complete search history.

(56) References Cited

U.S. PATENT DOCUMENTS

| | | |
   |---|---|---|
   | 2016/0083618 A1 | 3/2016 | Miyauchi et al. |
   | 2017/0152399 A1 | 6/2017 | Miyauchi et al. |
   | 2018/0273798 A1 | 9/2018 | Miyauchi et al. |
   | 2019/0071541 A1 | 3/2019 | Furuta et al. |

FOREIGN PATENT DOCUMENTS

| | | |
   |---|---|---|
   | JP | 2007-191659 A | 8/2007 |
   | JP | 2011-057824 A | 3/2011 |
   | JP | 2014-218632 A | 11/2014 |
   | JP | 2015-128823 A | 7/2015 |
   | JP | 2015-232117 A | 12/2015 |
   | JP | 2016-216720 A | 12/2016 |
   | JP | 2017-201027 A | 11/2017 |
   | WO | 99/28126 A1 | 6/1999 |
   | WO | 2008/096441 A1 | 8/2008 |
   | WO | 2010/027020 A1 | 3/2010 |
   | WO | 2017/195393 A1 | 11/2017 |
   | WO | 2018/180930 A1 | 10/2018 |

OTHER PUBLICATIONS

International Search Report issued in corresponding International Patent Application No. PCT/JP2019/039108 dated Dec. 24, 2019 (2 pages).

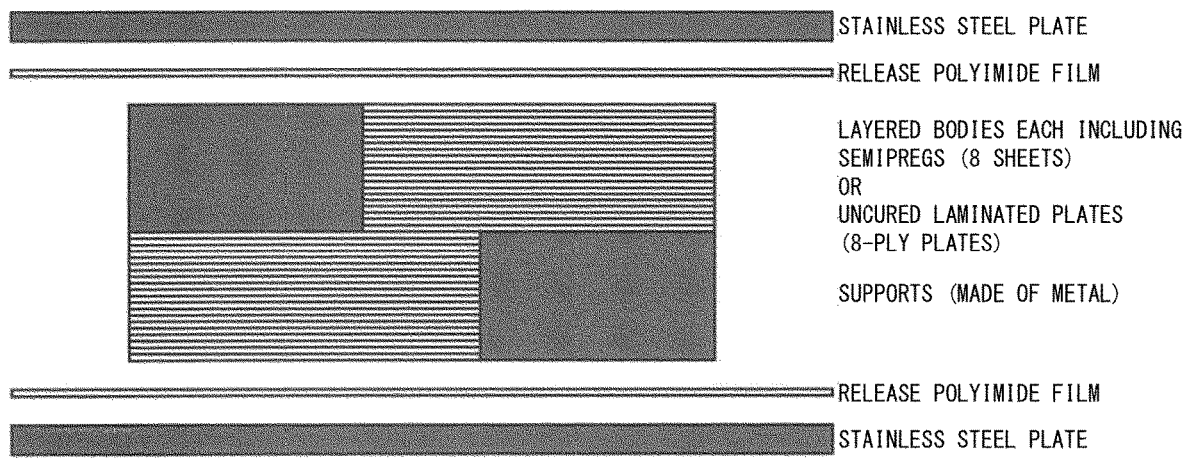

UNCURED LAMINATE, REINFORCING FIBER COMPOSITE MATERIAL, METHOD FOR PRODUCING UNCURED LAMINATE, AND METHOD FOR PRODUCING REINFORCING FIBER COMPOSITE MATERIAL

TECHNICAL FIELD

One or more embodiments of the present disclosure relate to an uncured layered plate, a reinforcing fiber composite material, a method for producing the uncured layered plate, and a method for producing the reinforcing fiber composite material. For example, one or more embodiments of the present invention relate to a reinforcing fiber composite material in which a plurality of layered plates are joined together, and a method for producing the reinforcing fiber composite material.

BACKGROUND

Aromatic polyimides have heat resistance which is of the highest level among polymeric substances and also exhibit excellent mechanical characteristics, excellent electrical characteristics, and the like. For these reasons, aromatic polyimides are used as a raw material in a wide range of fields, including aerospace and electrics/electronics.

Further, since a layered body which is a composite made up of such a polyimide and fibers has superior mechanical characteristics, the layered body is used in the field of aerospace. It is known that in practical applications, a plurality of such layered bodies are prepared and joined together so that a molded article suitable for an intended application (e.g., a large and thick molded article or a complex-form molded article) can be obtained.

However, aromatic polyimides generally have poor processability, and thus are particularly unsuited for use in melt molding and for use as a matrix resin in a reinforcing fiber composite material. For this reason, in cases where an aromatic polyimide is to be used as a matrix resin for a reinforcing fiber composite material, a polyimide capable of a thermal addition reaction is typically used. Such a polyimide is obtained by impregnating fibers with a low-molecular-weight imide oligomer, which is dissolved in a solvent having a high boiling point and is in a state of varnish, and then crosslinking and curing the resin in a final step.

For example, Patent Literature 1 discloses a prepreg which is produced by impregnating fibers with varnish of an imide oligomer modified terminally with a 4-(2-phenylethynyl) phthalic anhydride and drying the fibers; and a layered plate obtained by stacking and then heat-curing such prepregs. Patent Literature 1 also discloses, for example, N-methyl-2-pyrrolidone (NMP) as a solvent used in the varnish.

Patent Literature 2 discloses a reinforcing fiber composite material which is produced by stacking and then heat-curing a plurality of imide prepregs. Patent Literature 2 also discloses N-methyl-2-pyrrolidone (NMP) as a solvent used in varnish.

Patent Literature 3 discloses: a varnish in which a terminally modified imide oligomer precursor is dissolved in an organic solvent; a prepreg in which fibers are impregnated with the varnish; and a method for producing a reinforcing fiber composite material in which a plurality of such prepregs are stacked and heat-cured. Patent Literature 3 also discloses N-methyl-2-pyrrolidone (NMP) as the solvent used in the varnish.

On the other hand, also known are methods which do not use such a solvent having a high boiling point.

Patent Literature 4 discloses a technique for obtaining a prepreg. The technique is specifically carried out as below. Reinforcement fibers are immersed in a suspension which is prepared by dispersing a powder of an imide oligomer in a dispersion medium. Then, the dispersion medium is volatilized by heating the reinforcement fibers. Subsequently, the powder of the imide oligomer is heated and melted so that the reinforcement fibers are impregnated with the imide oligomer thus heated and melted. Subsequently, the imide oligomer is cooled and solidified. A prepreg is thus obtained.

In Patent Literature 5, a prepreg is produced in a state in which a melt viscosity during heating is lowered by using a mixture in which an imide oligomer having a reduced molecular weight is mixed with a thermoplastic polyimide.

[Patent Literature 1]
 Japanese Patent Application Publication Tokukai No. 2006-312700
[Patent Literature 2]
 Japanese Patent Application Publication Tokukai No. 2014-218632
[Patent Literature 3]
 Japanese Patent Application Publication Tokukai No. 2017-201027
[Patent Literature 4]
 Japanese Patent Application Publication Tokukai No. 2007-191659
[Patent Literature 5]
 Japanese Patent Application Publication Tokukai No. 2016-216720

However, in the above-described conventional techniques, there has been room for improvement from the viewpoint of realizing a reinforcing fiber composite material which exhibits good heat resistance and in which a plurality of layered plates are joined together only by heat and pressure without using an adhesive.

SUMMARY

An aspect of one or more embodiments of the present disclosure is to provide (i) a reinforcing fiber composite material which exhibits good heat resistance and in which a plurality of layered plates are joined together only by heat and pressure without using an adhesive and (ii) a method for producing the reinforcing fiber composite material.

The inventors of one or more embodiments of the present disclosure have made diligent studies and as a result, have found the following: (A) an uncured layered plate can be simply and safely obtained by mixing a powder of an imide oligomer with reinforcement fibers, without using any volatile component such as a solvent or a dispersion medium; (B) it is preferable to use, in particular, an imide oligomer having a specific structure; and (C) uncured layered plates, which have been obtained by methods described in (A) and (B), can be joined together by heat and pressure without using an adhesive, so that a reinforcing fiber composite material can be obtained. As a result, the inventors have accomplished one or more embodiments of the present disclosure.

In other words, one or more embodiments of the disclosure include the disclosure as in any of the following (Aspect 1) to (Aspect 3).

(Aspect 1) An uncured layered plate including a plurality of layers fused together, the plurality of layers each containing reinforcement fibers and a powder of an imide oligomer represented by the following general formula (1):

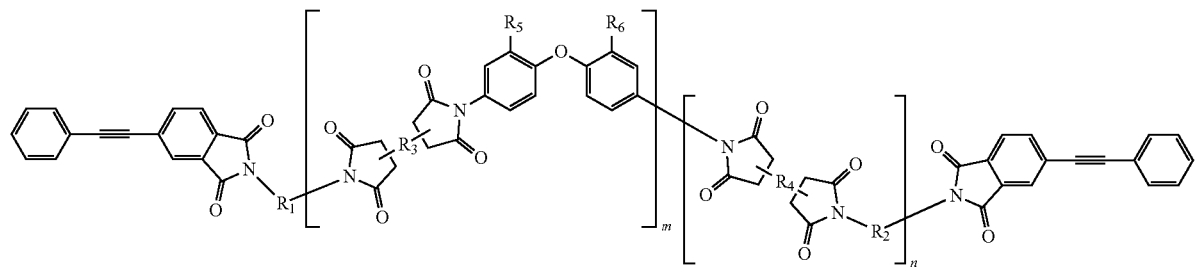

(1)

wherein
- $R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl) fluorene, 1,3-diaminobenzene, and 4-phenoxy-1,3-diaminobenzene;
- $R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;
- $R_3$ and $R_4$, which are identical to each other or different from each other, each represent a tetravalent residue of an aromatic tetracarboxylic acid;
- one of $R_5$ and $R_6$ represents a phenyl group, and the other one of $R_5$ and $R_6$ represents a hydrogen atom;
- m and n satisfy the following:

$1 \leq m$, $0 \leq n \leq 5$, $1 \leq m+n \leq 10$, and $0.5 \leq m/(m+n) \leq 1$; and a sequence of repeating units may be a block sequence or a random sequence.

(Aspect 2) A method for producing an uncured layered plate, the method including the steps of: stacking a plurality of layers each obtained by mixing a powder of an imide oligomer with reinforcement fibers in a dry step; and heating at a temperature at which the plurality of layers stacked are fused together but are not completely cured.

(Aspect 3) A method for producing a reinforcing fiber composite material, the method including the steps of:
(a) producing uncured layered plates each by (a-1) stacking a plurality of layers each of which is obtained by causing a powder of an imide oligomer to adhere to reinforcement fibers and then (a-2) heating at a temperature at which the plurality of layers fuse together but are not cured;
(b) obtaining a layered body by (b-1) stacking the uncured layered plates obtained in the step (a) and then (b-2) keeping the layered body at 260° C. to 340° C. and 0.1 MPa to 20 MPa for 5 minutes to 300 minutes; and
(c) further keeping the layered body, which has undergone the step (b), at 330° C. to 500° C. and 0.1 MPa to 20 MPa for 15 minutes to 120 minutes.

Aspects of the present disclosure provide a reinforcing fiber composite material which is obtained by (i) using uncured layered plates in which a residual of a volatile component is reduced and (ii) joining a plurality of such uncured layered plates together without using an adhesive or the like. This makes it possible to simply and safely obtain a molded article, such as a large and thick molded article or a complex-form molded article, preparation of which has been so far extremely difficult.

BRIEF DESCRIPTION OF THE DRAWINGS

FIG. 1 is a side view of a reinforcing fiber composite material in accordance with one or more embodiments of the present disclosure, that is, a side view of each element in steps for obtaining the reinforcing fiber composite material by joining uncured layered plates together or joining layered bodies, each of which includes semipregs, together. Specifically, uncured layered plates (8-ply plates) correspond to Examples 1 to 3, and semipregs (8 sheets) correspond to Comparative Example 1.

DETAILED DESCRIPTION OF THE EMBODIMENTS

The following description will discuss one or more embodiments of the present disclosure in detail. Any numerical range expressed as "A to B" in the present specification means "not less than A (equal to or more than A) and not more than B equal to or less than B)" unless otherwise stated.

[1. Uncured Layered Plate]

In order to obtain a layered body which is a composite material made of a thermosetting polyimide and fibers, a high-boiling point solvent such as NMP is necessary as disclosed in Patent Literatures 1 to 3. However, if the high-boiling point solvent remains in the layered body, physical properties in applications of the layered body may deteriorate and a safety problem may be caused by the solvent itself. Meanwhile, removal of the solvent requires a vacuum treatment in a hermetically-closed system at a high temperature. Under such a treatment condition, it has been necessary to break the hermetically-closed system in cases where the layered body is to be taken out before the thermosetting polyimide completely cures. In addition, it has been necessary to treat an incompletely cured layered body, which has been obtained as above, in a similar closed system again after the incompletely cured layered body undergoes desired processing such as thermal secondary processing. Such a process has been very complicated. For example, it has been very complicated to (i) take out uncured layered plates in the process of removing a solvent, then (ii) join a plurality of the uncured layered plates together by heat and pressure, and subsequently (iii) put the uncured layered plates thus joined together back into a hermetically-closed system and remove the solvent. Further, if in order to obtain a layered body which is a composite material made of a thermosetting polyimide and fibers, a layered body, in which the thermosetting polyimide has not been completely cured, is to be obtained, a high-boiling point solvent is remaining in the layered body. There has been a risk that this may lead to health damage due to exposure to the solvent or an environmental problem.

On the other hand, in the case of a system in which no solvent is used, for example, in the technique disclosed in Patent Literature 4, a suspension is used which is prepared by dispersing a powder of an imide oligomer in a dispersion medium. This causes the following problem. Specifically, a volatile component such as a dispersion medium remains in a prepreg and volatilizes during forming of a reinforcing fiber composite material. This causes the reinforcing fiber composite material to have a defect such as a void and/or have lower heat resistance. Under the circumstances, there has been a demand for development of a new technique that allows a reduction in residual volatile component. In addition, it has been unknown whether it is possible to join together a plurality of layered bodies which have been obtained by the technique disclosed in Patent Literature 4, by only heat and pressure without using an adhesive.

The technique disclosed in Patent Literature 5 is also considered to have room for improvement from the viewpoint of, for example, (i) prevention or reduction of a void and (ii) heat resistance. Furthermore, a cured product generally tends to have a lower glass transition temperature because thermoplastic polyimide is used in combination with the imide oligomer. In addition, it has been also unknown whether it is possible to join together a plurality of layered bodies which have been obtained by the technique disclosed in Patent Literature 5, by only heat and pressure without using an adhesive. In the first place, the technique of Patent Literature 5 is not intended to mix a powder of an imide oligomer and reinforcement fibers.

Further, in recent years, there has been a demand for joining a plurality of layered bodies together without using an adhesive. For example, use of an adhesive may impair heat resistance of a resulting reinforcing fiber composite material. In a case where an adhesive containing a solvent is used, the solvent may cause health damage and an environmental problem. In a case where water and an adhesive in which an emulsifier and/or a dispersing agent is/are used, the heat resistance of the resulting reinforcing fiber composite material may be impaired by the emulsifier and/or the dispersing agent which remain(s) in that reinforcing fiber composite material. On the other hand, it cannot be said that an adhesive, which has high heat resistance and which contains none of a solvent, water, an emulsifier, a dispersing agent, and the like, is always suitable. This is because (i) handling of such an adhesive is complicated, (ii) a manner of bonding is extremely limited since the adhesive is in the form of powder, and (iii) such an adhesive is expensive.

According to one or more embodiments of the present disclosure, none of the following (a) to (c) is necessary: (a) to use a high-boiling point solvent as in Patent Literatures 1 to 3, (b) to go through a suspension of the powder of the imide oligomer as in Patent Literature 4, and (c) to use a thermoplastic polyimide in combination as in Patent Literature 5. That is, it is possible to join together a plurality of uncured layered plates which have been obtained by a method in accordance with one or more embodiments of the present disclosure, without using an adhesive, so that the reinforcing fiber composite material can be produced.

One or more embodiments of the present disclosure provide an uncured layered plate which contains: a powder of an imide oligomer represented by the above general formula (1); and reinforcement fibers. More specifically, the uncured layered plate in accordance with one or more embodiments of the present disclosure includes a plurality of layers fused together, the plurality of layers each containing: a powder of an imide oligomer represented by the above general formula (1); and reinforcement fibers.

The uncured layered plate in accordance with one or more embodiments of the present disclosure is produced by mixing a powder of an imide oligomer and reinforcement fibers without using any volatile component such as a solvent or a dispersion medium. This makes it possible to provide an uncured layered plate which has a lower residual volatile component content. Furthermore, a reinforcing fiber composite material produced by use of such an uncured layered plate (e.g., a carbon fiber reinforced composite material) brings about an extremely advantageous effect of having a glass transition temperature equal to or higher than that of a simple resin due to reduction or elimination of a defect (e.g., a void) caused by volatilization and decomposition of, for example, a solvent. In the following description, the glass transition temperature may be simply referred to as "Tg".

The term "reinforcing fiber composite material" herein refers to a product which is obtained by joining a plurality of uncured layered plates together. The "reinforcing fiber composite material" can be also referred to as "resin composite material".

The term "uncured layered plate" herein does not mean a general layered plate in an uncured state, but is a term unique to the present disclosure recited in claims. Therefore, the uncured layered plate have a shape which is not limited to a flat plate shape and which can be any shape that a general layered body may have.

In conventional methods, it has been possible to obtain a layered plate by joining a plurality of semipregs or prepregs together by heat and pressure. However, since resin is cured during that joining process, it has been extremely difficult to obtain an uncured layered plate as in one or more embodiments of the present disclosure. Therefore, the uncured layered plate as in one or more embodiments of the present disclosure has not been known. In addition, characteristics of such an uncured layered plate have been also unknown.

Accordingly, it has not been known that such uncured layered plates can be joined together by heat and pressure without using an adhesive.

The term "semipreg" herein means a resin-reinforcement fiber composite obtained by partially impregnating reinforcement fibers with a resin such as an imide oligomer (i.e., in a semi-impregnated state) and integrating the resin with the reinforcement fibers. The "semipreg" includes, due to its semi-impregnated state, a fiber array which has been impregnated with no resin. This prevents the semipreg from losing drapeability, so that the semipreg is highly formative with respect to a complex form. An aspect of the "semipreg" frequently refers to a form in which reinforcement fibers have, on their outer surfaces, a layer which is rich in resin. Note that the term "semipreg" herein means a single-layer resin-reinforcement fiber composite.

The term "uncured layered plate" herein means a layered plate in which a plurality of layers each containing a resin (e.g., an imide oligomer) and reinforcement fibers are stacked and in which the resin is a thermosetting resin that is not completely cured and that has room for further curing to complete curing. The above-mentioned semipreg differs from the uncured layered plate in that the semipreg is made of a single layer. The term "uncured" means, for example, that in a resin taken out from a layered plate, a residual of a terminal reactive group is observed when the resin is measured by NMR, and/or curing reaction heat is observed when the resin is measured by DSC. More specifically, the term "uncured" means that when the resin taken out from layered plate is measured by a method described later in the Examples, the exothermic onset temperature is not lower than 300° C. On the other hand, the term "cured" means that in the layered plate, the resin is completely cured by heat and there is no room for further curing. The term "cured" means, for example, that in a resin taken out from a layered plate, no residual of a terminal reactive group is observed when the resin is measured by NMR, and/or no curing reaction heat is observed when the resin is measured by DSC. Note that since the resin of uncured layered plates has not been completely cured, a plurality of uncured layered plates which are bonded to each other can be easily detached from each other by hand for repositioning.

Note however that in the "uncured layered plate" described herein, it is necessary that the resin and the reinforcement fibers are integrated with each other as a whole to an extent that the resin and the reinforcement fibers cannot be easily separated from each other in any of the following states: (i) a state in which the reinforcement fibers are entirely impregnated with the resin (impregnated state), (ii) a state in which the reinforcement fibers are partially impregnated with the resin (semi-impregnated state); and (iii) a state in which the resin and the reinforcement fibers only adhere to each other to an extent that the resin and the reinforcement fibers cannot be easily separated from each other and in which the reinforcement fibers are not impregnated with the resin (unimpregnated state). That is, a plurality of layers contained in an uncured layered plate are fused together. Therefore, the plurality of layers thus fused in the uncured layered plate cannot be detached from each other. On the other hand, in a layered body obtained by stacking a plurality of semipregs, the plurality of semipregs can be easily detached from each other. The uncured layered plate thus differs from the layered body in which the above-described semipregs are merely stacked. Note that the layered body differs from the uncured layered plate also in that there is no room for further curing the layered body, which is obtained by curing, by heat and pressure, a plurality of semipregs having been stacked, to an extent that the plurality of semipregs cannot be detached from each other.

The "layered plate" herein refers to a layered body obtained by stacking film-shaped, membrane-shaped or thin-plate-shaped objects. The layered body may include, as a layer, a layered body which has a three-dimensional shape as a result of stacking layers. In other words, the "layered plate" is not necessarily limited to a planar layered body.

The term "imide oligomer" herein used is synonymous with the term "terminally modified imide oligomer" unless otherwise specified.

According to one or more embodiments of the present disclosure, a divalent residue of an aromatic diamine of each of $R_1$ and $R_2$ refers to an aromatic organic group existing between two amino groups in the aromatic diamine. A tetravalent residue of an aromatic tetracarboxylic acid refers to an aromatic organic group surrounded by four carbonyl groups in the aromatic tetracarboxylic acid. Here, the term "aromatic organic group" refers to an organic group having an aromatic ring. The aromatic organic group is preferably an organic group having 4 to 30 carbon atoms, more preferably an organic group having 4 to 18 carbon atoms, and even more preferably an organic group having 4 to 12 carbon atoms. The aromatic organic group is preferably a group having 6 to 30 carbon atoms and including hydrogen, more preferably a group having 6 to 18 carbon atoms and including hydrogen, and even more preferably a group having 6 to 12 carbon atoms and including hydrogen.

$R_1$ is a divalent residue of an aromatic diamine and is preferably a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl) fluorene, 1,3-diaminobenzene, and 4-phenoxy-1,3-diaminobenzene.

$R_2$ is a divalent residue of an aromatic diamine and is preferably a divalent residue of an aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene.

$R_3$ and $R_4$ are each a tetravalent residue of an aromatic tetracarboxylic acid and may be identical to each other or different from each other. The term "aromatic tetracarboxylic acid" herein encompasses an aromatic tetracarboxylic acid, an aromatic tetracarboxylic dianhydride, and acid derivatives (such as an ester and a salt) of an aromatic tetracarboxylic acid.

The tetravalent residue of the aromatic tetracarboxylic acid is preferably selected from residues derived from a 1,2,4,5-benzenetetracarboxylic acid. The term "1,2,4,5-benzenetetracarboxylic acid" encompasses 1,2,4,5-benzenetetracarboxylic acid, 1,2,4,5-benzenetetracarboxylic dianhydride (PMDA), and acid derivatives (such as an ester and a salt) of 1,2,4,5-benzenetetracarboxylic acid. In particular, the 1,2,4,5-benzenetetracarboxylic dianhydride is optimal.

$R_5$ and $R_6$ are each a hydrogen atom or a phenyl group. One of $R_5$ and $R_6$ represents a phenyl group. In other words, one of $R_5$ and $R_6$ is a hydrogen atom and the other one of $R_5$ and $R_6$ is a phenyl group. In a case where m>1, the imide oligomer may optionally contain a repeating unit in which $R_5$ is the phenyl group and $R_6$ is the hydrogen atom and a repeating unit in which $R_5$ is the hydrogen atom and $R_6$ is the phenyl group.

$R_1$ to $R_6$ may be different or identical in each repeating unit.

The expression "a sequence of repeating units may be a block sequence or a random sequence" herein means that the repeating units may be block polymerized or may be randomly polymerized.

According to one or more embodiments of the present disclosure, a powder of an imide oligomer contained in an uncured layered plate is preferably a powder of an imide oligomer represented by the following general formula (2):

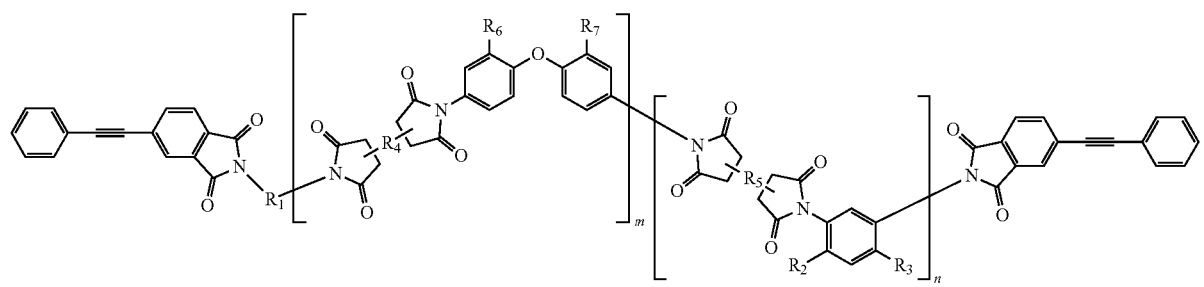

(2)

wherein:
$R_1$ represents a divalent residue of an aromatic diamine selected from 2-phenyl-4,4'-diaminodiphenylether and 4-phenoxy-1,3-diaminobenzene;
one of $R_2$ and $R_3$ represents a phenoxy group, and the other one of $R_2$ and $R_3$ represents a hydrogen atom;
$R_4$ and $R_5$, which are identical to each other or different from each other, each represent a tetravalent residue of an aromatic tetracarboxylic acid;
one of $R_6$ and $R_7$ represents a phenyl group, and the other one of $R_6$ and $R_7$ represents a hydrogen atom;
m and n satisfy the following:

$1 \leq m$, $0 \leq n \leq 5$, $1 \leq m+n \leq 10$, and $0.5 \leq m/(m+n) \leq 1$; and a sequence of repeating units may be a block sequence or a random sequence.

$R_1$ is a divalent residue of an aromatic diamine and is preferably a divalent residue of an aromatic diamine selected from 2-phenyl-4,4'-diaminodiphenylether and 4-phenoxy-1,3-diaminobenzene.

$R_2$ and $R_3$ are each a hydrogen atom or a phenoxy group, and one of $R_2$ and $R_3$ represents a phenoxy atom. In other words, one of $R_2$ and $R_3$ is a hydrogen atom and the other one of $R_2$ and $R_3$ is a phenoxy group. In a case where n>1, the imide oligomer may optionally contain a repeating unit in which $R_2$ is the phenoxy group and $R_3$ is the hydrogen atom and a repeating unit in which $R_2$ is the hydrogen atom and $R_3$ is the phenoxy group.

The definitions of $R_4$, $R_5$, $R_6$, and $R_7$ in the general formula (2) are similar to those of $R_3$, $R_4$, $R_5$, and $R_6$ in the general formula (1), respectively.

$R_1$ to $R_7$ may be different or identical in each repeating unit.

According to one or more embodiments of the present disclosure, in a case where $R_4$ and $R_5$ in the general formula (2) are each a residue of a 1,2,4,5-benzenetetracarboxylic acid, the imide oligomer is represented by the following general formula (3):

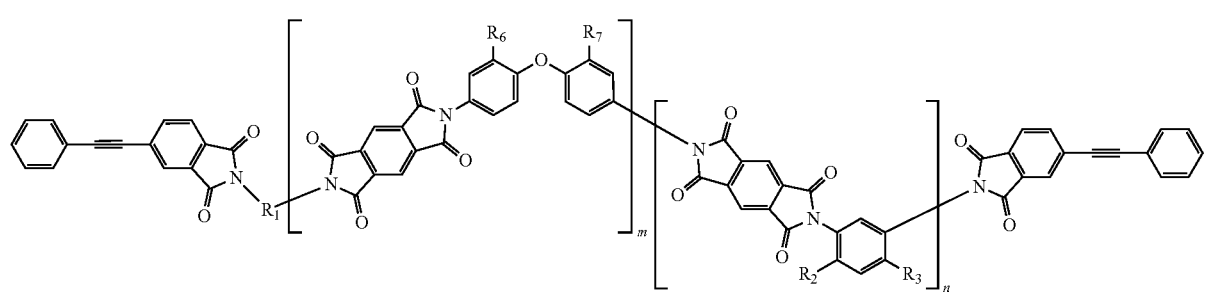

(3)

wherein:
$R_1$ represents a divalent residue of an aromatic diamine selected from 2-phenyl-4,4'-diaminodiphenylether and 4-phenoxy-1,3-diaminobenzene;
one of $R_2$ and $R_3$ represents a hydrogen atom and the other one of $R_2$ and $R_3$ represents a phenoxy group;
one of $R_6$ and $R_7$ represents a hydrogen atom and the other one of $R_6$ and $R_7$ represents a phenyl group;

m and n satisfy the following:

$$1 \leq m,$$

$$0 \leq n \leq 5,$$

$$1 \leq m+n \leq 10, \text{ and}$$

$$0.5 \leq m/(m+n) \leq 1; \text{ and}$$

a sequence of repeating units may be a block sequence or a random sequence.

In the imide oligomer in accordance with one or more embodiments of the present disclosure, a 1,2,4,5-benzenetetracarboxylic acid may be used alone as the aromatic tetracarboxylic acid, or part of the 1,2,4,5-benzenetetracarboxylic acid may be substituted with another aromatic tetracarboxylic acid compound, to the extent that the effect of one or more embodiments of the present disclosure is still brought about. Examples of the "another aromatic tetracarboxylic acid compound" include 3,3',4,4'-biphenyltetracarboxylic dianhydride (s-BPDA), 3,3',4,4'-benzophenonetetracarboxylic dianhydride (BTDA), 2,3,3',4'-biphenyltetracarboxylic dianhydride (a-BPDA), 2,2',3,3'-biphenyltetracarboxylic dianhydride (i-BPDA), 2,2-bis(3,4-dicarboxyphenyl) methane dianhydride, bis(3,4-carboxyphenyl)ether dianhydride, and 1,2,3,4-benzenetetracarboxylic dianhydride.

In the imide oligomer in accordance with one or more embodiments of the present disclosure, 2-phenyl-4,4'-diaminodiphenylether, 9,9-bis(4-aminophenyl)fluorene, 9,9-bis(4-(4-aminophenoxy)phenyl)fluorene, 1,3-diaminobenzene, or 4-phenoxy-1,3-diaminobenzene of $R_1$ in the general formula (1), or part of 2-phenyl-4,4'-diaminodiphenylether or 4-phenoxy-1,3-diaminobenzene of $R_1$ in the general formula (2) may be substituted with another aromatic diamine compound. Examples of the "another aromatic diamine compound" include 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenylether (4,4'-ODA), 3,4'-diaminodiphenylether (3,4'-ODA), 3,3'-diaminodiphenylether, 2-phenyl-3',4-diaminodiphenylether, 2-phenyl-2',4-diaminodiphenylether, 3-phenyl-4,4'-diaminodiphenylether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl) methane, 4,4'-methylene-bis(2,6-diethylaniline), bis(2-ethyl-6-methyl-4-aminophenyl) methane, 4,4'-methylene-bis(2-ethyl-6-methylaniline), 2,2-bis(3-aminophenyl) propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, and 9,9-bis(4-(4-aminophenoxy)phenyl)fluorene. These compounds may be used alone or in combination of two or more.

In the imide oligomer in accordance with one or more embodiments of the present disclosure, m and n in each of the general formula (1) and the general formula (2) satisfy $1 \leq m$, $0 \leq n \leq 5$, $1 \leq m+n \leq 10$, and $0.5 \leq m/(m+n) \leq 1$. $1 \leq m \leq 5$ may alternatively be satisfied. $0 < n \leq 5$ may alternatively be satisfied. $1 < m+n \leq 10$ may alternatively be satisfied. $0.5 \leq m/(m+n) < 1$ may alternatively be satisfied. For m and n, m+n is preferably not less than 4, and more preferably not less than 5. It is preferable for m and n to satisfy the above inequalities. This is because satisfaction of the inequalities by m and n causes a terminally modified imide oligomer in accordance with one or more embodiments of the present disclosure to have even better storage stability in a solution state and have high heat resistance and excellent mechanical strength after being cured.

The imide oligomer in accordance with one or more embodiments of the present disclosure has a minimum melt viscosity which is preferably not more than 20000 Pa·sec, more preferably not more than 10000 Pa·sec, even more preferably not more than 5000 Pa·sec, and particularly preferably not more than 3000 Pa·sec. The imide oligomer in accordance with one or more embodiments of the present disclosure has a minimum melt viscosity which falls within the range of 1 Pa·sec to 20000 Pa·sec. Note, however, that the imide oligomer in accordance with one or more embodiments of the present disclosure has a minimum melt viscosity whose range is not particularly limited to the above range. The minimum melt viscosity which falls within the above range is preferable because such a minimum melt viscosity allows the imide oligomer in accordance with one or more embodiments of the present disclosure to have excellent moldability. Note that the "minimum melt viscosity" herein refers to that measured by a method described later in the Examples.

The imide oligomer in accordance with one or more embodiments of the present disclosure may be obtained by mixing terminally modified imide oligomers having differing molecular weights. The terminally modified imide oligomer in accordance with one or more embodiments of the present disclosure may be mixed with another soluble polyimide or thermoplastic polyimide. The thermoplastic polyimide is not particularly limited in, for example, type, and may be any polyimide that softens when heated, specifically, any commercially available polyimide. The uncured layered plate in accordance with one or more embodiments of the present disclosure preferably contains substantially no thermoplastic polyimide.

The imide oligomer in accordance with one or more embodiments of the present disclosure has a melt viscosity at 280° C. of 200 Pa·sec to 1000000 Pa·sec, more preferably 200 Pa·sec to 800000 Pa·sec, and even more preferably 200 Pa·sec to 500000 Pa·sec. A melt viscosity at 280° C. of more than 1000000 Pa·sec tends to make it difficult for the imide oligomer to flow. Thus, it is difficult to cause imide oligomer impregnation between fibers during production of a reinforcing fiber composite material. This tends to make it difficult to obtain a reinforcing fiber composite material in which a defect such as a void or an unimpregnated part has been reduced or eliminated. A melt viscosity at 280° C. of less than 200 Pa·sec causes a resin to too easily flow. This tends to make it difficult to produce an uncured layered plate. As a result, it may be difficult to achieve drapeability which an uncured layered plate should have. The "melt viscosity at 280° C." herein refers to that measured by a method described later in the Examples.

A polyimide resin which is obtained by curing the imide oligomer in accordance with one or more embodiments of the present disclosure has a 5% weight reduction temperature in air of preferably not lower than 520° C., more preferably not lower than 530° C., and even more preferably not lower than 535° C. A 5% weight reduction temperature in air is considered to be correlated with a rate at which a polyimide resin which is used in a high temperature environment for a long time oxidizes and deteriorates. A polyimide resin which has a higher 5% weight reduction temperature in air can be used in a high temperature environment for a longer time. That is, a polyimide resin which has a higher 5% weight reduction temperature in air can be said to be a material which is highly stably resistant to heat for a long term. The "5% weight reduction temperature in air" herein refers to that measured by a method described later in the Examples.

According to one or more embodiments of the present disclosure, examples of reinforcement fibers contained in an uncured layered plate include inorganic fiber such as carbon fiber, glass fiber, metal fiber, ceramic fiber, as well as organic synthetic fiber such as polyamide fiber, polyester-based fiber, polyolefin-based fiber, and novoloid fiber. These types of fiber may be used alone or in combination of two or more.

In particular, in order for a reinforcing fiber composite material produced from the uncured layered plate to have excellent mechanical characteristics and high heat resistance, it is desirable to use carbon fiber as the reinforcement fibers. The carbon fiber is not particularly limited provided that the carbon fiber is a material which (i) has a carbon content in a range of 85 weight % to 100 weight % and (ii) is in the form of continuous fibers whose structure is at least partially a graphite structure. Examples of the carbon fiber include polyacrylonitrile (PAN)-based carbon fiber, rayon-based carbon fiber, lignin-based carbon fiber, and pitch-based carbon fiber. Out of these, PAN-based carbon fiber, pitch-based carbon fiber, and the like are preferable, because such carbon fibers are versatile, inexpensive, and have high strength.

The carbon fiber typically undergoes sizing. Note, however, that it is preferable to use the carbon fiber in which a sizing agent is used in an amount which is as small as possible. Alternatively, it is preferable to remove a sizing agent if necessary by an existing method such as an organic solvent treatment or a heat treatment. The sizing agent is used in an amount of preferably not more than 0.5 wt %, more preferably not more than 0.1 wt %, and even more preferably not more than 0.01 wt %, with respect to the carbon fiber. For carbon fiber, a sizing agent for an epoxy resin is typically used. Thus, the sizing agent may be decomposed at a temperature of not lower than 280° C. at which to cure the imide oligomer in accordance with one or more embodiments of the present disclosure. This may adversely affect physical properties of a reinforcing fiber composite material. It is possible to open a fiber bundle in advance by use of, for example, air or a roller, and then cause resin impregnation between individual fibers of carbon fiber. The opening of the fiber bundle makes a resin impregnation distance shorter. This makes it easier to obtain a reinforcing fiber composite material in which a defect such as a void has been further reduced or eliminated.

A form of the reinforcement fibers constituting the uncured layered plate in accordance with one or more embodiments of the present disclosure is exemplified by, but not particularly limited to, structures such as unidirectional (UD) materials, textiles (a plain weave, a twill weave, a satin weave, and the like), knitted goods, braided goods, and nonwoven fabrics. The form of the fiber material can be selected as appropriate in accordance with the purpose of use. These forms may be used alone or in combination.

The uncured layered plate in accordance with one or more embodiments of the present disclosure has a volatile component which remains in an amount of preferably less than 20 wt %, more preferably less than 10 wt %, even more preferably less than 5 wt %, and particularly preferably less than 1 wt %, with respect to the imide oligomer contained in the uncured layered plate. The volatile component herein mainly contains a solvent used during production of the imide oligomer but also contains moisture which is desorbed from an amide acid oligomer in which imidization has not proceeded. The volatile component refers to that measured by a method described later in the Examples. The uncured layered plate whose volatile component remains in an amount falling within the above range is preferable. This is because such a uncured layered plate allows a defect (e.g., a void) caused by volatilization and decomposition of, for example, a solvent to be reduced or eliminated in a case where a reinforcing fiber composite material (e.g., a carbon fiber reinforced composite material) is produced by use of the uncured layered plate, so that a favorable composite material can be obtained which has Tg equal to or higher than that of a simple resin.

The uncured layered plate in accordance with one or more embodiments of the present disclosure has preferably not less than two plies, more preferably not less than three plies, even more preferably not less than four plies, and most preferably not less than five plies, on the premise that a combination of a layer made of a powder of an imide oligomer and another layer made of reinforcement fibers is counted as one ply. There is no particular upper limit to the number of plies. However, if the uncured layered plate is too thick, production may become difficult. Therefore, the uncured layered plate has preferably not more than 1000 plies, more preferably not more than 500 plies, even more preferably not more than 300 plies, and most preferably not more than 200. The powder of the imide oligomer may be identical or different in molecular weight or composition in each of the plies, but is preferably identical in each of the plies. Meanwhile, the reinforcement fibers may be identical or different in type or form in each of the plies, but are preferably identical.

[2. Method for Producing Uncured Layered Plate]

One or more embodiments of the present disclosure provides a method for producing an uncured layered plate, the method including the step of mixing a powder of an imide oligomer with reinforcement fibers in a dry step. More specifically, the method in accordance with one or more embodiments of the present disclosure for producing an uncured layered plate includes the steps of: stacking a plurality of layers each obtained by mixing a powder of an imide oligomer with reinforcement fibers in a dry step; and heating at a temperature at which the plurality of layers stacked in the above step of stacking are fused together but are not completely cured.

The method in accordance with one or more embodiments of the present disclosure for producing an uncured layered plate makes it possible to provide an uncured layered plate in which a residual volatile component has been reduced.

The imide oligomer in accordance with one or more embodiments of the present disclosure is not limited to any particular imide oligomer and can be any modified imide oligomer that is used in the present technical field. That is, the imide oligomer in accordance with one or more embodiments of the present disclosure can be a terminally modified imide oligomer or does not need to be a terminally modified imide oligomer. Examples of the imide oligomer in accordance with one or more embodiments of the present disclosure include a both-terminal modified imide oligomer, a one-terminal modified imide oligomer, and a side chain modified imide oligomer. These imide oligomers may be used alone or in combination of two or more. For example, the imide oligomer in accordance with one or more embodiments of the present disclosure may have a terminal capped with 4-phenylethynyl phthalic anhydride. According to one or more embodiments of the present disclosure, the imide oligomer is preferably an imide oligomer represented by the above general formula (1), and more preferably an imide oligomer represented by the above general formula (2). An imide oligomer which is represented by the above general formula (1) or (2) has an advantage of achieving a reinforcing fiber composite material which has excellent moldability, high heat resistance, and excellent mechanical properties.

The powder of the imide oligomer in accordance with one or more embodiments of the present disclosure can be commercially available or can be produced by a method which is typically used in the present technical field.

According to one or more embodiments of the present disclosure, an example of a method for producing the powder of the imide oligomer includes the following steps (1) and (2).

<Step (1)>

According to one or more embodiments of the present disclosure, the step (1) is a step of producing varnish containing a terminally modified imide oligomer.

The aromatic tetracarboxylic acid; aromatic diamines including 2-phenyl-4,4'-diaminodiphenylether and 4-phenoxy-1,3-diaminobenzene; and 4-(2-phenylethynyl) phthalic anhydride are used so that a total amount of acid anhydride groups (in the case of mutually adjacent dicarboxylic acid groups, it is considered that there is 1 mol of an acid anhydride group per 2 mol of a carboxyl group) and a total amount of amino groups in all components are substantially equal to each other. The components are polymerized in an organic solvent (described later) at a reaction temperature of not higher than approximately 100° C., particularly not higher than 80°C, so that an amide acid oligomer is produced. The amide acid oligomer is an oligomer having an amide-acid bond and is also known as an amic acid oligomer. Next, the amide acid oligomer is dehydrated and cyclized by a method of adding an imidization agent at a low temperature of approximately 0° C. to 140° C., or by a method of heating the amide acid oligomer to a high temperature of 140° C. to 275° C. This makes it possible to obtain an imide oligomer (terminally modified imide oligomer) having 4-(2-phenylethynyl)phthalic anhydride residue at its terminal(s). As described above, a 1,2,4,5-benzenetetracarboxylic acid (particularly, 1,2,4,5-benzenetetracarboxylic dianhydride) is preferably used as the aromatic tetracarboxylic acid.

The step (1) in accordance with one or more embodiments of the present disclosure is particularly preferably carried out, for example, by the following method. First, aromatic diamines including 2-phenyl-4,4'-diaminodiphenylether and 4-phenoxy-1,3-diaminobenzene are homogenously dissolved in an organic solvent (described later), and thereafter one or more aromatic tetracarboxylic dianhydrides including 1,2,4,5-benzenetetracarboxylic dianhydride are added to the obtained solution and dissolved homogenously therein so as to obtain a reaction solution. Thereafter, the reaction solution is stirred at a reaction temperature of approximately 5° C. to 60° C. for approximately 1 minute to 180 minutes. Next, 4-(2-phenylethynyl) phthalic anhydride is added to the reaction solution and homogenously dissolved therein. Thereafter, the reaction solution is caused to react while being stirred at a reaction temperature of approximately 5° C. to 60° C. for approximately 1 minute to 180 minutes, so as to produce the above-described terminally modified amide acid oligomer. Thereafter, the reaction solution is stirred at 140° C. to 275° C. for 5 minutes to 24 hours so as to cause the amide acid oligomer to undergo an imidization reaction. In this way, the varnish containing the terminally modified imide oligomer in accordance with one or more embodiments of the present disclosure can be obtained. A low imidization rate causes water desorbed from inside a molecule to be a volatile component during forming of a reinforcing fiber composite material. This may cause a defect such as a void or cause decomposition of an oligomer. Thus, the imidization rate is preferably not less than 95%, more preferably not less than 97%, and even more preferably not less than 98%. The imidization rate refers to that measured by a method described later in the Examples. If necessary, the terminally modified imide oligomer in accordance with one or more embodiments of the present disclosure may be obtained by cooling the reaction solution to approximately room temperature after the terminally modified amide acid oligomer undergoes the imidization reaction. It is suitable to carry out the reactions in such a manner that some or all of the reaction steps are carried out in an inert gas (such as nitrogen gas or argon gas) atmosphere or in a vacuum.

Examples of the organic solvent include N-methyl-2-pyrrolidone (NMP), N, N-dimethylacetamide (DMAc), N, N-diethylacetamide, N-methylcaprolactam, γ-butyrolactone (GBL), and cyclohexanone. These solvents may be used alone or in combination of two or more. In selecting these solvents, it is possible to apply known techniques regarding soluble polyimides.

<Step (2)>

According to one or more embodiments of the present disclosure, the step (2) is a step of producing a terminally modified imide oligomer powder from the varnish containing the terminally modified imide oligomer.

In the present step (2), the varnish obtained in the step (1) and containing the terminally modified imide oligomer is poured into water, a poor solvent such as methanol, or a nonsolvent, and thereafter the terminally modified imide oligomer is isolated in a form of a powdery product. In this way, a terminally modified imide oligomer powder can be produced.

Alternatively, according to one or more embodiments of the present disclosure, the powder of the imide oligomer can be produced by a so-called "high-temperature melt synthesis method" or "high-temperature solid-phase synthesis method" described in "Saishin poriimido—Kiso to Ôyô—[Basic and applied latest polyimide] compiled by Japan Polyimide Research Group; edited and written by Yoshio Imai and Rikio Yokota, NTS Inc., pp. 20-26 (2002)". It is suitable to produce the powder of the imide oligomer by a high-temperature melt synthesis method or a high-temperature solid-phase synthesis method. This is because of the following reason. Specifically, in such a synthesis method, no solvent is used to polymerize a terminally modified imide oligomer, and no volatile component is used to isolate a terminally modified imide oligomer, so that an amount of a volatile component which is brought into an imide oligomer can be made as small as possible.

The terminally modified imide oligomer powder obtained by the above-described method can be used in the following dry step.

A method in accordance with one or more embodiments of the present disclosure for producing an uncured layered plate includes the step of mixing a powder of an imide oligomer and reinforcement fibers in a dry step. This makes it possible to obtain a layer containing the powder of the imide oligomer and the reinforcement fibers. According to the method in accordance with one or more embodiments of the present disclosure for producing an uncured layered plate, a plurality of such layers are stacked.

The "dry step" herein means a step of mixing a powder of an imide oligomer and reinforcement fibers without using any volatile component such as a solvent or a dispersion medium. According to a conventional method, a prepreg is produced by impregnating reinforcement fibers with varnish containing a terminally modified imide oligomer (i.e., solution composition of a terminally modified imide oligomer). This causes a problem such that a volatile component such as a solvent remains in a resultant prepreg. There are some examples in which a reduction in residual volatile component is attempted by drying a prepreg in which a volatile component such as a solvent remains. Note, however, that a step of evaporating, in a state of a prepreg, a volatile component such as a solvent is not preferable because such a step imposes a heavy load on production and/or equipment. According to one or more embodiments of the present disclosure, an uncured layered plate is produced in the dry step in which a volatile component such as a solvent or a dispersion medium is not used. Thus, it is possible to obtain an uncured layered plate in which a residual volatile component has been reduced. This is an effect which is more advantageous than that brought about by the conventional technique.

One or more embodiments of the present disclosure is not particularly limited provided that a powder of an imide oligomer and reinforcement fibers are mixed in the dry step. For example, a powder of an imide oligomer is adhered to reinforcement fibers by placing the powder of the imide oligomer on the reinforcement fibers, spraying the powder of the imide oligomer on the reinforcement fibers, or letting the reinforcement fibers through a vessel which contains the powder of the imide oligomer. Thereafter, the powder of the imide oligomer may be melted by use of, for example, a heating roller such as a nip roller, a pressing machine, a laminator machine, an IR heater, a laser, a gas torch, or an ultrasonic torch. Alternatively, it is possible to first melt the powder of the imide oligomer and then impregnate the reinforcement fibers with the imide oligomer by pressure application. Production of an uncured layered plate does not necessarily require pressure application.

The "dry step" herein may be carried out, by opening a fiber bundle in advance by use of, for example, air or a roller, so as to cause resin impregnation between individual fibers of carbon fiber. The opening of the fiber bundle makes a resin impregnation distance shorter. This makes it easier to obtain a reinforcing fiber composite material in which a defect such as a void has been further reduced or eliminated.

One or more embodiments of the present disclosure includes, in production of an uncured layered plate, the step of heating at a temperature at which a plurality of layers stacked are fused together but are not completely cured. More preferably, the method for producing an uncured layered plate includes the step of heating at a temperature (T3) which is higher than a glass transition temperature (T1) of an imide oligomer and which is lower than a curing temperature (T2) of the imide oligomer. This causes the plurality of layers, which have been stacked, to fuse together. The uncured layered plate thus obtained can be confirmed to be uncured, by finding the presence of a residual of a terminal reactive group in measurement by NMR and/or by observation of curing reaction heat in measurement by DSC. The plurality of layers are subjected to preferably not only heating but also pressure application.

Although the above processing temperature (T3) is exemplified by a temperature of 230° C. to 370° C., the temperature (T3) is preferably 240° C. to 350° C., and more preferably 250° C. to 340° C.

According to one or more embodiments of the present disclosure, a hot press, a vacuum hot press, or the like is used as a pressing machine. For example, an uncured layered plate can be obtained by heating and melting at a pressure of 0.1 MPa to 20 MPa for 0.1 minutes to 100 minutes. Note that values of pressure herein all refer to values of actual pressure applied to samples.

Note that reinforcement fibers in accordance with one or more embodiments of the present disclosure are similar to those described earlier in [1. Uncured layered plate].

The powder of the imide oligomer used in one or more embodiments of the present disclosure is not limited to any particular powder of an imide oligomer. Note, however, that the powder of the imide oligomer for use in one or more embodiments of the present disclosure have an average particle size of preferably 1 μm to 1000 μm, more preferably 10 μm to 500 μm, and even more preferably 10 μm to 300 μm. Note also that an entire particle size distribution preferably falls within the range of 1 μm to 1000 μm. The powder of the imide oligomer which has an average particle size of less than 1 μm may form a lot of fine powder while being caused to adhere to the reinforcement fibers in the dry step. This may cause a deterioration in workability. The powder of the imide oligomer which has an average particle size of more than 1000 μm may cause the reinforcement fibers to flow together with the imide oligomer, when the powder of the imide oligomer is heated and melted so that the reinforcement fibers are impregnated or fused with the imide oligomer. This may break an alignment of the reinforcement fibers or cause great unevenness in adhesion of the imide oligomer to the reinforcement fibers. Note that the "average particle size" and the "particle size distribution" herein refer to those measured by methods described later in the Examples.

The powder of the imide oligomer can be obtained by a known method. For example, a pulverization method carried out by use of, for example, a hammer mill, a jet mill, a ball mill, or a bead mill may be employed. Alternatively, frost shattering may be carried out. If necessary, classification may be carried out by use of, for example, a vibrating sieve or a rotary air jet sieve.

[3. Reinforcing Fiber Composite Material]

A reinforcing fiber composite material in accordance with one or more embodiments of the present disclosure can be obtained by stacking and then heat-curing at least two layered plates including the above-described uncured layered plate. For example, the reinforcing fiber composite material may be obtained by stacking and then heat-curing only a plurality of the above-described uncured layered plates, or alternatively by stacking and then heat-curing the uncured layered plate and another layered plate(s) which is/are not the uncured layered plate. For example, the reinforcing fiber composite material may be obtained by stacking and heat-curing only two or more uncured layered plates, or by stacking and then heat-curing at least one uncured layered plate and at least one layered plate which is not an uncured layered plate. For example, the reinforcing fiber composite material in accordance with one or more embodiments of the present disclosure may be obtained by stacking and then heat-curing layered plates including, in combination, an uncured layered plate and a layered plate which is obtained by completely curing the uncured layered plate, or alternatively, by stacking and then heat-curing layered plates including, in combination, the uncured layered plate and a layered plate which contains a resin or fibers different from that/those of the uncured layered plate in accordance with one or more embodiments of the present disclosure. As another alternative, the reinforcing fiber composite material may be obtained by stacking and then heat-curing the uncured layered plate and a commercially available layered plate in combination.

When the uncured layered plate(s) and a layered plate(s) which is/are not the uncured layered plate(s) are to be stacked, it is preferable that none of the layered plates be in contact with another one of the layered plates so that the uncured layered plate can function as an adhesive body. For example, in a case where at least two uncured layered plates and at least one layered plate which is not the uncured layered plate are stacked, it is preferable that the at least one layered plate be sandwiched between the uncured layered plates so that none of the at least one layered plate can be in contact with another one of the at least one layered plate. Further, in a case where at least one uncured layered plate and at least two layered plates each of which is not the uncured layered plate are stacked, it is preferable that the uncured layered plate be sandwiched between the layered plates.

According to one or more embodiments of the present disclosure, the reinforcing fiber composite material is produced by curing at a temperature (T4) which is higher than the curing temperature (T2) of the imide oligomer. The reinforcing fiber composite material thus obtained can be confirmed to have been cured, by finding no residual of a terminal reactive group in measurement by NMR and/or by observation of no curing reaction heat in measurement by DSC.

Although the above processing temperature (T4) is exemplified by a temperature of 280° C. to 500° C., the temperature (T4) is preferably 310° C. to 450° C., more preferably 340° C. to 400° C., and even more preferably 350° C. to 400° C.

According to one or more embodiments of the present disclosure, a reinforcing fiber composite material can be obtained by stacking a predetermined number of uncured layered plates described above and then heat-curing, with use of an autoclave, a (vacuum) hot press, or the like, the uncured layered plates at a pressure of 0.1 MPa to 100 MPa for approximately 10 minutes to 40 hours.

All these steps may be carried out in a vacuum or in an inert gas, or may be carried out in the atmosphere.

The reinforcing fiber composite material in accordance with one or more embodiments of the present disclosure has a glass transition temperature (Tg) of preferably not lower than 320° C., and more preferably not lower than 350° C. The glass transition temperature which falls within the above range causes the reinforcing fiber composite material in accordance with one or more embodiments of the present disclosure to have higher heat resistance. Note that the "glass transition temperature" herein refers to that measured by a method described later in the Examples.

A reinforcing fiber composite material structure may be obtained by inserting, between (a) the reinforcing fiber composite material and (b) a material of a different kind or an identical kind, the imide oligomer molded into film form, the powder of the imide oligomer, or the semipreg or the prepreg, and then heating and melting the imide oligomer, the powder of the imide oligomer, or the semipreg or the prepreg so as to produce an integrated structure. The material of a different kind is not particularly limited and can be any material ordinarily used in the present field. Examples of the material of a different kind include a metal material having, for example, a honeycomb-like shape, and a core material having, for example, a sponge-like shape.

It can be also said that the reinforcing fiber composite material in accordance with one or more embodiments of the present disclosure is a joined body including at least one uncured layered plate which contains: a powder of an imide oligomer represented by the above general formula (1); and reinforcement fibers. More specifically, it can be said that the reinforcing fiber composite material can be obtained by stacking and then heat-curing at least two layered plates including the above-described uncured layered plate. In other words, the reinforcing fiber composite material includes at least two layered plates which are joined to each other.

Further, the method in accordance with one or more embodiments of the present disclosure for producing a reinforcing fiber composite material can include the following steps of:

(a) producing uncured layered plates by causing a powder of an imide oligomer to adhere to reinforcement fibers and then heating;

(b) obtaining a layered body by stacking the uncured layered plates obtained in the step (a) and then keeping the layered body at 260° C. to 340° C. and 0.1 MPa to 20 MPa for 5 minutes to 300 minutes; and (c) further keeping the layered body, which has undergone the step (b), at 330° C. to 500° C. and 0.1 MPa to 20 MPa for 15 minutes to 120 minutes.

More specifically, the step (a) is the step of producing an uncured layered plate by: stacking a plurality of layers each obtained by causing a powder of an imide oligomer to adhere to reinforcement fibers; and then heating at a temperature at which the plurality of layers fuse together but are not cured.

The method in accordance with one or more embodiments of the present disclosure for producing the reinforcing fiber composite material can be also said to be a method for producing a joined body of uncured layered plates, which method includes the step of heat-curing the uncured layered plates each containing: a powder of an imide oligomer represented by the above general formula (1); and reinforcement fibers. More specifically, the method for producing the reinforcing fiber composite material includes the step of heat-curing an uncured layered plate including a plurality of fused layers each containing: a powder of an imide oligomer represented by the above-mentioned general formula (1); and reinforcement fibers.

[5. Uses]

The uncured layered plate, the reinforcing fiber composite material, and the like can be used in a wide range of fields which require easy moldability and high heat resistance and which include the fields of aircraft and space industry devices, vehicle engine (peripheral) members, and general industrial uses such as a transfer arm, a robot arm, and slidable members (e.g., a roll material, a friction member, and a bearing). Examples of an aircraft member include a fan case of an engine, an inner frame of the engine, a rotor blade (e.g., a fan blade) of the engine, a stationary blade (structure guide vane (SGV)) of the engine, a bypass duct of the engine, and various pipes of the engine. Preferable examples of a vehicle member include brake members, engine members (e.g., a cylinder, a motor case, and an air box), and energy regeneration system members.

The present disclosure is not limited to the embodiments, but can be altered by a skilled person in the art within the scope of the claims. The present disclosure also encompasses, in its technical scope, any embodiment derived by combining technical means disclosed in differing embodiments.

Note that embodiments of the present disclosure can be configured as follows.

[1] An uncured layered plate including a plurality of layers fused together, the plurality of layers each containing reinforcement fibers and a powder of an imide oligomer represented by the above general formula (1).

[2] The uncured layered plate as described in [1], wherein the imide oligomer is represented by the above general formula (2).

[3] The uncured layered plate as described in [1] or [2], wherein a volatile component remains in an amount of less than 20 wt % with respect to the imide oligomer.

[4] A method for producing an uncured layered plate, the method including the steps of: stacking a plurality of layers each obtained by mixing a powder of an imide oligomer with reinforcement fibers in a dry step; and
heating at a temperature at which the plurality of layers stacked in the step of stacking are fused together but are not completely cured.

[5] The method as described in [4], wherein in the step of heating, heating is carried out at a temperature (T3) which is higher than a glass transition temperature (T1) of the imide oligomer and which is lower than a curing temperature (T2) of the imide oligomer.

[6] The method as described in [4], wherein the imide oligomer has a terminal capped with 4-phenylethynyl phthalic anhydride.

[7] A method for producing a reinforcing fiber composite material, the method comprising the step of stacking and then heat-curing at least two layered plates, the at least two layered plates including one uncured layered plate described in any one of [1] to [3] or two or more uncured layered plates described in any one of [1] to [3].

[8] The method as described in [7], wherein the step of heat-curing includes the step of stacking and then heat-curing only the two or more uncured layered plates.

[9] The method as described in [7], wherein the step of heat-curing includes the step of stacking and then heat-curing at least the one uncured layered plate and at least one layered plate which is not the uncured layered plate.

The method as described in any one of [7] to [9], wherein the step of heat-curing is carried out at a processing temperature (T4) of not lower than 340° C. and not higher than 400° C.

A method for producing a reinforcing fiber composite material, the method including the steps of:
(a) producing uncured layered plates each by (a-1) stacking a plurality of layers each of which is obtained by causing a powder of an imide oligomer to adhere to reinforcement fibers and then (a-2) heating at a temperature at which the plurality of layers fuse together but are not cured;
(b) obtaining a layered body by (b-1) stacking the uncured layered plates obtained in the step (a) and then (b-2) keeping the layered body at 260° C. to 340° C. and 0.1 MPa to 20 MPa for 5 minutes to 300 minutes; and
(c) further keeping the layered body, which has undergone the step (b), at 330° C. to 500° C. and 0.1 MPa to 20 MPa for 15 minutes to 120 minutes.

The method as described in [11], further including, before the step (a), the step of opening a fiber bundle of the reinforcement fibers.

The method as described in or [12], wherein the imide oligomer is represented by the above general formula (1).

A reinforcing fiber composite material obtained by stacking and then heat-curing at least two layered plates, the at least two layered plates including one uncured layered plate described in any one of [1] to [3] or two or more uncured layered plate described in any one of [1] to [3].

The reinforcing fiber composite material as described in [14], obtained by the step of stacking and then heat-curing only the two or more uncured layered plates, or by the step of stacking and then heat-curing at least the one uncured layered plate and at least one layered plate which is not the uncured layered plate.

An uncured layered plate containing: a powder of an imide oligomer represented by the above general formula (1); and reinforcement fibers.

The uncured layered plate as described in [16], wherein m+n is not less than 4 in the imide oligomer.

The uncured layered plate as described in or [17], wherein the imide oligomer has a minimum melt viscosity of 1 Pa·sec to 20000 Pa·sec.

The uncured layered plate as described in any one of [16] to [18], wherein the imide oligomer has a melt viscosity at 280° C. of 200 Pa·sec to 1000000 Pa·sec.

The uncured layered plate as described in any one of [16] to [19], wherein a polyimide resin which is obtained by curing the imide oligomer has a 5% weight reduction temperature in air of not lower than 520° C.

A method for producing an uncured layered plate, the method including the step of mixing a powder of an imide oligomer with reinforcement fibers in a dry step.

The method as described in [21], further including the step of laminating at a temperature (T3) which is higher than a glass transition temperature (T1) of the imide oligomer and which is lower than a curing temperature (T2) of the imide oligomer.

The method as described in [22], wherein the lamination temperature (T3) of the uncured layered plate is not lower than 250° C. and not higher than 340° C.

A method for producing a reinforcing fiber composite material, the method including the step of stacking and then heat-curing at least two layered plates, the at least two layered bodies including one uncured layered plate described in any one of [16] to [20] or two or more uncured layered plates described in any one of [16] to [20].

The method as described in [24], including the step of stacking and then heat-curing only the two or more uncured layered plates.

The method as described in [24], including the step of stacking and then heat-curing at least the one uncured layered plate and at least one layered plate which is not the uncured layered plate, none of the at least one layered plate being provided in contact with another one of the at least one layered plate.

The method as described in [24], including the step of stacking and then heat-curing at least the two uncured layered plates and at least one layered plate which is not the uncured layered plate, in a manner that each of the at least one layered plate is sandwiched between the uncured layered plates so that none of the at least one layered plate can be in contact with another one of the at least one layered plate.

A method for producing a reinforcing fiber composite material, the method including the steps of:
(a) producing uncured layered plates by (a-1) causing a powder of an imide oligomer to adhere to reinforcement fibers and then (a-2) heating;
(b) obtaining a layered body by (b-1) stacking the uncured layered plates obtained in the step (a) and then (b-2) keeping the layered body at 260° C. to 340° C. and 0.1 MPa to 20 MPa for 5 minutes to 300 minutes; and (c) further keeping the layered body, which has undergone the step (b), at 330° C. to 500° C. and 0.1 MPa to 20 MPa for 15 minutes to 120 minutes.

The reinforcing fiber composite material being a joined body including at least one uncured layered plate which contains: a powder of an imide oligomer represented by the above general formula (1); and reinforcement fibers.

A method for producing a joined body, the method including heat-curing an uncured layered plate which contains: a powder of an imide oligomer represented by the above general formula (1); and reinforcement fibers.

EXAMPLES

Examples and Comparative Examples of the present disclosure will be described below. Note, however, that the present disclosure is not limited by the following Examples. In the present Examples, values of pressure all refer to values of actual pressure applied to samples, but not values of pressure indicated by, for example, a pressing machine.

[Test Methods]

(1) Measurement of Glass Transition Temperature (Tg) and Measurement of Exothermic Onset Temperature
(Film-Like Resin)

Measurements were carried out with use of a dynamic viscoelastic behavior measurement (DMA) apparatus (RSA-II, manufactured by Rheometric). The measurements were carried out at a temperature increase rate of 5° C./min and a frequency of 1 Hz. The glass transition temperature was considered to be the point of intersection of (i) a line tangent to a storage modulus of elasticity curve before a fall in the storage modulus of elasticity curve and (ii) a line tangent to the storage modulus of elasticity curve after the fall in the storage modulus of elasticity curve.

(Reinforcing Fiber Composite Material)

A central part of a reinforcing fiber composite material plate was cut so that test pieces were produced. Then, measurements were carried out with use of a dynamic viscoelastic behavior measurement (DMA) apparatus (DMA-Q-800, manufactured by TA Instruments), by a single cantilever method, with 0.1% strain, at a frequency of 1 Hz, and at a temperature increase rate of 5° C./min. The glass transition temperature was considered to be the point of intersection of (i) a line tangent to a storage modulus of elasticity curve before a fall in the storage modulus of elasticity curve and (ii) a line tangent to the storage modulus of elasticity curve after the fall in the storage modulus of elasticity curve.

(Resins)

Measurements were carried out with use of an apparatus (Q100 DSC manufactured by TA Instruments). Conditions for the measurements were set as follows: in a first run, temperature was increased from 40° C. to 285° C. at a temperature increase rate of 20° C./min and then kept at 285° C. for 5 minutes; and in a second run, the temperature was increased from 40° C. to 500° C. at a temperature increase rate of 10° C./min. The glass transition temperature was considered to be the point of intersection of (i) a line tangent to a heat flow (W/g) curve before a fall in the heat flow (W/g) curve in the second run and (ii) a line tangent to the heat flow (W/g) curve after the fall in the heat flow (W/g) curve in the second run. Further, in a case where an exothermic peak was observed in the heat flow (W/g) curve, the exothermic onset temperature was considered to be the point of intersection of (i) a line tangent to a slope to the exothermic peak and (ii) a baseline.

(2) Measurements of Minimum Melt Viscosity and Melt Viscosity at 280° C.

Measurements were carried out with use of a rheometer (DISCOVERY HR-2, manufactured by TA Instruments) with 25 mm parallel plates and at a temperature increase rate of 5° C./min. Note that the "minimum melt viscosity" means a minimum value of melt viscosity measured under the above conditions.

(3) Observation of Cross Section

A central part of a reinforcing fiber composite material plate was cut. The cut central part was embedded in an epoxy resin (EpoHold R, 2332-32R/EpoHold H, 2332-8H, manufactured by SANKEI Co., Ltd.), and then the epoxy resin was cured. A surface of the epoxy resin was polished with use of Mecatech 334 manufactured by PRESI, so that observation samples were produced. Observation of cross sections of reinforcing fiber composite materials (observation samples) was carried out with use of an optical microscope (Axioplan2 Imaging, manufactured by Carl Zeiss Microscopy, or VHX-5000, manufactured by Keyence Corporation).

(4) Measurement of Residual NMP

Approximately 20 mg/mL of a DMF solution containing a terminally modified imide oligomer powder was prepared, and quantification was carried out by GC/MS analysis (GC: 6890N, manufactured by Agilent technologies, MS: 5973N, manufactured by Agilent technologies, column: SUPELCO-WAX 0.25 mm ID×30 m).

(5) Measurement of Imidization Rate

A peak area was measured at 30° C. by dissolving a terminally modified imide oligomer powder in deuterated DMF (deuterated N, N-dimethylacetamide) and using a proton nuclear magnetic resonance spectroscopic device (model: AV-400M, manufactured by Bruker Japan K.K., 1H-NMR). An imidization rate was calculated from (i) a peak area whose chemical shift is 7 ppm to 9 ppm and which is derived from aromatic 1H and (ii) a peak area whose chemical shift is around 11 ppm and which is derived from a residual amide.

(6) Measurements of Volatile Component Content, Carbon Fiber Content, and Terminally Modified Imide Oligomer Content A predetermined amount of a prepared uncured layered plate or semipreg was measured. Then, a volatile component was removed by leaving the prepared uncured layered plate or semipreg to stand in an oven at 280° C. for 1 hour. Thereafter, a volatile component content was found by measuring the weight of the prepared uncured layered plate or semipreg again. A resin component was washed off by washing the prepared uncured layered plate or semipreg with NMP. Subsequently, the prepared uncured layered plate or semipreg was dried, and then a carbon fiber content (fiber weight content) was found by measuring the weight of the prepared uncured layered plate or semipreg. A terminally modified imide oligomer content was found by deducting the volatile component weight and the carbon fiber weight from the total weight.

(7) Measurement of Particle Size Distribution of Terminally Modified Imide Oligomer A terminal imide oligomer powder was redispersed in isopropyl alcohol, and a volume average particle size distribution was measured with use of a laser diffraction particle size distribution measuring device (Mastersizer, manufactured by Malvern). A 50% cumulative volume average particle size was considered to be an average particle size.

(8) Measurement of 5% Weight Reduction Temperature in Air

A 5% weight reduction temperature was measured with use of a thermogravimetric analysis (TGA) apparatus (EXSTAR TG/DTA6300, manufactured by Seiko Instruments), in an atmospheric environment, and at a temperature increase rate of 5° C./min.

(9) Shear Bond Strength

The shear bond strength was evaluated by using a tester (Autograph AGS-X, manufactured by Shimadzu Corporation). In this evaluation, a distance between chucks was 50 mm and a TS was 1 mm/min. Further, a fracture type was visually checked and evaluated. In this evaluation, cases where a base material and/or a bonding layer was/were broken were evaluated as MF/CF, whereas cases where interfacial peeling occurred were evaluated as AF.

Production Example 1

To a 300 mL three-necked flask having a thermometer and a stirrer, 23.43 g (84.8 mmol) of 2-phenyl-4,4'-diaminodiphenylether and 82.5 g of N-methyl-2-pyrrolidone (NMP) were added. After the 2-phenyl-4,4'-diaminodiphenylether was dissolved, 3.28 g (9.41 mmol) of 9,9-bis(4-aminophenyl)fluorene was added to the flask and stirred until dissolved. Next, 16.44 g (75.4 mmol) of 1,2,4,5-benzenetetracarboxylic dianhydride was added to the flask. Nitrogen was then filled into and sealed in the flask, and a polymerization reaction was allowed to take place at room temperature for 1.5 hours so that an amide acid oligomer was produced. To the reaction solution containing the amide acid oligomer, 9.35 g (37.7 mmol) of 4-(2-phenylethynyl)phthalic anhydride (PEPA) and 15 g of NMP were added. Then, nitrogen was filled into and sealed in the flask, and a reaction was allowed to take place at room temperature for 1.5 hours so that the amide acid oligomer was terminally modified. Thereafter, a nitrogen introduction tube was attached to the flask, and stirring was carried out under flow of a nitrogen gas stream for 5 hours at 200° C. so that imide bonds were formed and cooling was carried out. Thus, a terminally modified imide oligomer NMP solution (varnish) (N1) was obtained.

Production Example 2

The terminally modified imide oligomer NMP solution (varnish) (N1) obtained in Production Example 1 was diluted to 15 weight % and then introduced into 3300 mL of ion exchange water. A solid content which precipitated was separated by filtering. The solid content obtained through the filtering was washed for 30 minutes with 1000 mL of methanol and then dried under reduced pressure for 14 hours at 200° C., so that a granular terminally modified imide oligomer was obtained. Thereafter, the granular terminally modified imide oligomer was pulverized with use of a hammer mill, so that a terminally modified imide oligomer powder (P1) having an average volume particle size of 61 μm was obtained.

The terminally modified imide oligomer was composed such that, in the above general formula (1), $R_1$ was represented by a 2-phenyl-4,4'-diaminodiphenylether residue or a 9,9-bis(4-aminophenyl)fluorene residue, $R_2$ was represented by a 9,9-bis(4-aminophenyl)fluorene residue, $R_3$ and $R_4$ were each represented by a 1,2,4,5-benzenetetracarboxylic dianhydride residue, and, on average, m=3.6 and n=0.4.

Residual NMP of the terminally modified imide oligomer powder (P1) was analyzed with use of GC/MS. As a result, 790 ppm of NMP remained. Furthermore, an imidization rate measured with use of $^1$H-NMR was 98.5%. Moreover, the terminally modified imide oligomer powder (P1) was able to be dissolved, into an NMP solvent which was at room temperature, so as to achieve a concentration of not less than 35 weight %. A 35 wt % NMP solution (varnish) remained stable, without exhibiting gelation or the like, after being left to stand at room temperature for 1 month. The terminally modified imide oligomer powder (P1) which had not been cured had a minimum melt viscosity of 193 Pa·sec (348° C.) and a melt viscosity at 280° C. of approximately 30000 Pa·sec. A film-like cured product (thickness: 90 μm) was obtained by heating the terminally modified imide oligomer in powder form with use of a hot press for 1 hour at 370° C. With use of the film-like cured product, measurement of Tg was carried out by the DMA, and the Tg of the film-like cured product was 368° C. Furthermore, the film-like cured product was subjected to measurement of a 5% weight reduction temperature in air, and the 5% weight reduction temperature in air was 537° C.

Comparative Example 1

On a plain-woven carbon fiber material ("TORAYCA cloth CO6343", manufactured by Toray Industries, Inc., fiber mass per unit area: 198 g/m$^2$), which had been cut so as to have a size of 12 cm×12 cm and had been priorly subjected to de-sizing, 1.70 g of the terminally modified imide oligomer powder (P1) obtained in Production Example 2 was placed so as to be homogenously dispersed. The terminally modified imide oligomer powder (P1) thus placed on the plain-woven carbon fiber material was sandwiched between release polyimide films and further sandwiched between 20 cm×20 cm stainless steel plates, so that a stack was obtained. Then, the stack was heated at 288° C. for 1 minute under a slight pressure with use of a pressing machine (MINI TEST PRESS.10, manufactured by Toyo Seiki Seisaku-sho, Ltd.). Thereafter, the stack was pressed at 288° C. for 3 minutes while a pressure of 10 MPa was applied thereto. A semipreg (D1) was thus obtained. When this semipreg (D1) was touched with a hand, the semipreg (D1) was not found to be sticky.

A part of this semipreg was cut and only a resin component was cut from the part. Then, the resin component was subjected to DSC measurement. As a result, Tg was observed around 230° C. and the exothermic onset temperature was observed around 350° C. From this result, it was considered that curing of this semipreg has not yet been completed.

By a method similar to the above method, 4 semipregs were produced. A fiber weight content estimated from the plain-woven carbon fiber material weight obtained before the semipregs had been produced and the semipreg weight obtained after the semipregs had been produced was 61 wt % on average. Assuming that a carbon fiber density was 1.8 g/cm$_3$ and a terminally modified imide oligomer density was 1.3 g/cm$^3$, a fiber volume content (Vf) was estimated to be 53%.

The semipregs thus obtained were each cut so as to have a size of 1.5 cm×7.625 cm, and 8 semipregs were stacked. Layered bodies (DP-1) were thus obtained.

The layered bodies were each a stack in which the semipregs were simply stacked by hand, so that the semipregs were easily detached from each other.

Two layered bodies were prepared and stacked on top of each other in a shear test piece shape (a bonding area between the layered bodies was 1.5 cm×1.25 cm) by using a metal supports. In the layered bodies thus stacked on top of each other, the semipregs, which were components of each of the layered bodies, were easily detached from each other when the layered bodies were put on a place that was not level or when an external stimulus such as slight vibrations was applied to the layered bodies. In such a case, it was necessary to stack the layered bodies on top of each other again in the shear test piece shape. This operation was very complicated. For the same reason, a re-positioning operation such as adjusting the bonding area between the layered bodies was also very complicated.

The layered bodies, in each of which the semipregs were stacked, were wrapped with a release polyimide film. After the layered bodies were placed on a 45 cm×45 cm stainless steel plate, the layered bodies were heated to 288° C. under a slight pressure on a 50 cm×50 cm hot press by the above-described pressing machine. After the layered bodies were heated at 288° C. for 10 minutes, the layered bodies were subjected to application of a pressure of 10 MPa. The layered bodies were further heated for 90 minutes. Thereafter, the layered bodies were heated to 370° C. at a temperature increase rate of 10° C./min while remaining under pressure, and then were kept at 370° C. for 60 minutes. Subsequently, the layered bodies were cooled, so that a shear test piece (SP-1) was obtained.

A part of this test piece was cut and subjected to measurement of Tg by the DMA. As a result, no Tg resulting from an uncured resin component was observed. From this result, it was considered that curing of the test piece has been completed.

This test piece could not be delaminated by force applied by human hands. Meanwhile, in visual observation of the test piece, the resin was found to protrude from the base material.

Furthermore, the shear bond strength was evaluated to be 19.0 MPa and the fracture type was evaluated as material failure/cohesive failure (MF/CF).

Example 1

A stack was prepared by alternately placing (i) a layer of 1.70 g of the terminally modified imide oligomer powder (P1) obtained in Production Example 2 and (ii) a layer of a plain-woven carbon fiber material ("TORAYCA cloth CO6343", manufactured by Toray Industries, Inc., fiber mass per unit area: 198 g/m$^2$), which had been cut so as to have a size of 12 cm×12 cm and had been priorly subjected to de-sizing. In the stack, there were 16 layers in total, 8 layers of which were layers of the terminally modified imide oligomer powder (P1) and 8 layers of which were layers of the plain-woven carbon fiber material. The stack thus formed was sandwiched between release polyimide films and further sandwiched between 20 cm×20 cm stainless steel plates. Then, a resultant stack including the polyimide films and the stainless steel plates was heated at 288° C. for 10 minutes under a slight pressure with use of a pressing machine (MINI TEST PRESS·10, manufactured by Toyo Seiki Seisaku-sho, Ltd.). Thereafter, the stack thus heated was pressed at 288°C for 90 minutes while a pressure of 10 MPa was applied thereto. A layered plate in an uncured state was thus obtained. This layered plate in an uncured state was cut to a size of 1.5 cm×7.625 cm by a diamond cutter, so that an uncured layered plate (DP-2) was obtained. When the uncured layered plate was touched with a hand, the uncured layered plate was not found to be sticky.

A part of this uncured layered plate was cut and only a resin component was cut from the part. Then, the resin component was subjected to DSC measurement. As a result, Tg was observed around 230° C. and the exothermic onset temperature was observed around 350° C. From this result, it was considered that curing of this uncured layered plate has not yet been completed. Note that whereas the semipreg of Comparative Example 1 is a semipreg including a single layer (which contains one layer of the terminally modified imide oligomer powder (P1) and one layer of the plain-woven carbon fiber material), the uncured layered plate here was obtained by fusing together a plurality of layers each of which contains the terminally modified imide oligomer powder (P1) and the plain-woven carbon fiber material. Thus, the uncured layered plate differs from the semipreg of Comparative Example 1, and also differs from a layered body containing a plurality of semipregs of Comparative Example 1.

Two uncured layered plates obtained as described above were prepared and stacked on top of each other in a shear test piece shape (a bonding area between the uncured layered plates was 1.5 cm×1.25 cm) by using a metal supports. Note that the uncured layered plates stacked on top of each other could be easily detached from each other by force applied by human hands for re-positioning, and could be stacked again on top of each other in the shear test piece shape. In this case, the layers, which were components of each of the uncured layered plates, were never detached from each other. Therefore, the re-positioning was simple.

The uncured layered plates having been stacked on top of each other were wrapped with a release polyimide film. After the uncured layered plates were placed on a 45 cm×45 cm stainless steel plate, the uncured layered plates were heated to 288° C. under a slight pressure on a 50 cm×50 cm hot press by the above-described pressing machine. After the uncured layered plates were heated at 288° C. for 10 minutes, the uncured layered plates were subjected to application of a pressure of 10 MPa. The uncured layered plates were further heated for 90 minutes. Thereafter, the uncured layered plates were heated to 370° C. at a temperature increase rate of 10° C./min while remaining under pressure, and then were kept at 370° C. for 60 minutes. Subsequently, the uncured layered plates were cooled, so that a shear test piece (SP-2) was obtained.

A part of this test piece was cut and subjected to measurement of Tg by the DMA. As a result, no Tg resulting from an uncured resin component was observed. From this result, it was considered that curing of the test piece has been completed.

This test piece could not be delaminated by force applied by human hands. Meanwhile, in visual observation of the test piece, the resin was found to protrude from the base material.

Furthermore, the shear bond strength was evaluated to be 14.5 MPa and the fracture type was evaluated as material failure/cohesive failure (MF/CF).

Example 2

An uncured layered plate (DP-3) was obtained as in Example 1 except that conditions for obtaining the layered plate in an uncured state was changed from those of Example 1 to heating to 300° C. under a slight pressure, heating for 10 minutes, and pressing at 300° C. under a pressure of 10 MPa for 90 minutes. When this layered plate was touched with a hand, the layered plate was not found to be sticky.

A part of this uncured layered plate was cut and only a resin component was cut from the part. Then, the resin component was subjected to DSC measurement. As a result, Tg was observed around 230° C. and the exothermic onset temperature was observed around 350° C. From this result, it was considered that curing of this uncured layered plate has not yet been completed.

Two layered plates obtained as described above were prepared and stacked on top of each other in a shear test piece shape as in Example 1. Note that the uncured layered plates stacked on top of each other could be easily detached from each other by force applied by human hands for re-positioning, and could be stacked again on top of each other in the shear test piece shape. In this case, layers, which were components of each of the uncured layered plates, were never detached from each other. Therefore, the re-positioning was simple.

Further, a shear test piece (SP-3) was obtained as in Example 1 except that conditions for obtaining the shear test piece was changed from those of Example 1 to heating to 300° C. and heating at 300° C. for 10 minutes, next applying a pressure of 10 MPa, further heating for 90 minutes, and subsequently, after heating to 370° C. at a temperature increase rate of 10° C./min under pressure, maintaining the temperature at 370° C. for 60 minutes.

A part of this test piece was cut and subjected to measurement of Tg by the DMA. As a result, no Tg resulting from an uncured resin component was observed. From this result, it was considered that curing of the test piece has been completed.

This test piece could not be delaminated by force applied by human hands. Meanwhile, in visual observation of the test piece, the resin was found to slightly protrude from the base material.

Furthermore, the shear bond strength was evaluated to be 15.0 MPa and the fracture type was evaluated as material failure/cohesive failure (MF/CF).

Example 3

An uncured layered plate (DP-4) was obtained as in Example 1 except that conditions for obtaining the layered plate in an uncured state was changed from those of Example 1 to heating to 330° C. under a slight pressure, heating for 10 minutes, and pressing at 330° C. under a pressure of 10 MPa for 90 minutes. When this layered plate was touched with a hand, the layered plate was not found to be sticky.

Two layered plates obtained as described above were prepared and stacked on top of each other in a shear test piece shape as in Example 1. Note that the uncured layered plates stacked on top of each other could be detached from each other by force applied by human hands for re-positioning, and could be stacked again on top of each other in the shear test piece shape.

Further, a shear test piece (SP-4) was obtained as in Example 1 except that conditions for obtaining the shear test piece was changed from those of Example 1 to heating to 330° C. and heating at 330° C. for 10 minutes, next applying a pressure of 10 MPa, further heating for 90 minutes, and subsequently, after heating to 370° C. at a temperature increase rate of 10° C./min under pressure, maintaining the temperature at 370° C. for 60 minutes.

A part of this test piece was cut and subjected to measurement of Tg by the DMA. As a result, no Tg resulting from an uncured resin component was observed. From this result, it was considered that curing of the test piece has been completed.

This test piece could not be delaminated by force applied by human hands. Meanwhile, in visual observation of the test piece, the resin was not found to protrude from the base material.

Furthermore, the shear bond strength was evaluated to be 7.8 MPa and the fracture type was evaluated as interfacial peeling (AF).

Comparative Example 2

An uncured layered plate (DP-2) was obtained as in Example 1.

One uncured layered plate obtained here was prepared, and wrapped with a release polyimide film. After the uncured layered plate was placed on a 45 cm×45 cm stainless steel plate, the uncured layered plate was heated to 288° C. on a 50 cm×50 cm hot press by the above-described pressing machine. After the uncured layered plate was heated at 288°C for 10 minutes, the uncured layered plate was subjected to application of a pressure of 10 MPa. The uncured layered plate was further heated for 90 minutes. Thereafter, the uncured layered plate was heated to 370° C. at a temperature increase rate of 10° C./min while remaining under pressure, and then was kept at 370° C. for 60 minutes. Subsequently, the uncured layered plate was cooled, so that a completely cured layered plate (DP-5) was obtained. Comparative Example 2 differs from Examples 1 to 3 in that this completely cured layered plate is used.

A part of this layered plate was cut and subjected to measurement of Tg by the DMA. As a result, no Tg resulting from an uncured resin component was observed. From this result, it was considered that curing of this test piece has been completed.

Two completely cured layered plates obtained as described above were prepared. Then, between the two completely cured layered plates, sandwiched was a stack containing: 40 mg of the terminally modified imide oligomer powder (P1); and two Upilex films (thickness: 75 μm) which served as a spacer and which were stacked on top of each other. The completely cured layered plates were stacked on top of each other in a shear test piece shape (a bonding area between the layered plates was 1.5 cm×1.25 cm) while the stack intervened between the completely cured layered plates. Note that it was easy to cause, by force applied by human hands, delamination of a resultant layered body obtained by stacking the completely cured layered plates. However, in such a case, the terminally modified imide oligomer powder fell apart and dropped out, and the films serving as a spacer were also detached. On this account, it was very complicated to make a stack in the shear test piece shape again. Further, in a case where the layered body obtained by stacking the completely cured layered plates was put on a place that was not level or when an external stimulus such as slight vibrations was applied to the layered body, the terminally modified imide oligomer powder fell apart and dropped out, and the films serving as a spacer was also detached. On this account, the layered body obtained by stacking the completely cured layered plates was inferior in workability. For the same reason, a re-positioning operation such as adjusting the bonding area between the layered plates was also very complicated.

The layered body in whole was wrapped with a release polyimide film. After the layered body was placed on a 45 cm×45 cm stainless steel plate, the layered bodies were heated to 288° C. under a slight pressure on a 50 cm×50 cm hot press by the above-described pressing machine. After the layered body was heated at 288°C for 10 minutes, the layered body was subjected to application of a pressure of 10 MPa. The layered body was further heated for 90 minutes. Thereafter, the layered body was heated to 370° C. at a temperature increase rate of 10° C./min while remaining under pressure, and then was kept at 370° C. for 60 minutes. Subsequently, the layered body was cooled, so that a shear test piece (SP-5) was obtained.

This test piece could not be delaminated by force applied by human hands. Meanwhile, in visual observation of the test piece, the resin was found to slightly protrude from the base material.

Furthermore, the shear bond strength was evaluated to be 11.5 MPa and the fracture type was evaluated as material failure/cohesive failure (MF/CF).

Comparative Example 3

Two completely cured layered plates were prepared as in Comparative Example 2 and stacked on top of each other in a shear test piece shape (a bonding area between the layered plates was 1.5 cm×1.25 cm). In other words, no terminally modified imide oligomer powder (P1) was sandwiched between the completely cured layered plates in Comparative Example 3. In this case, the completely cured layered plates were not at all bonded to each other.

Tables 1-6 show results of the above.

TABLE 1

| | \multicolumn{8}{c|}{Uncured layered plate or semipreg used} |
| | Name of uncured layered plate/ semipreg | Resin | Fiber | Number of stacked layers | Press temperature | Press pressure | Press time |
|---|---|---|---|---|---|---|---|
| Comparative Example 1 | D1 | P1 (imide oligomer powder) | Plain-woven carbon fiber material | Resin: 1 layer Fiber: 1 layer | 288° C. | slight pressure followed by 10 MPa | 1 min (slight pressure) followed by 3 min (10 MPa) |
| Example 1 | DP-2 | same as above | same as above | Resin: 8 layers Fiber: 8 layers | 288° C. | slight pressure followed by 10 MPa | 10 min (slight pressure) followed by 90 min (10 MPa) |
| Example 2 | DP-3 | same as above | same as above | same as above | 300° C. | slight pressure followed by 10 MPa | 10 min (slight pressure) followed by 90 min (10 MPa) |
| Example 3 | DP-4 | same as above | same as above | same as above | 330° C. | slight pressure followed by 10 MPa | 10 min (slight pressure) followed by 90 min (10 MPa) |
| Comparative Example 2 | DP-2 | | | | \multicolumn{3}{c|}{(same as DP-2)} |

TABLE 2

| | \multicolumn{5}{c|}{Uncured layered plate or semipreg used} |
| | Tackiness of uncured layered plate/ semipreg | Tg (DSC) | Exothermic onset temperature (DSC) | Fiber weight content | Fiber volume content |
|---|---|---|---|---|---|
| Comparative Example 1 | Not sticky | Around 230° C. | Around 350° C. | 61 wt % | 53 vol % |
| Example 1 | Not sticky | Around 230° C. | Around 350° C. | 61 wt % | 53 vol % |
| Example 2 | Not sticky | Around 230° C. | Around 350° C. | 61 wt % | 53 vol % |
| Example 3 | Not sticky | Not measured | Not measured | 61 wt % | 53 vol % |
| Comparative Example 2 | \multicolumn{5}{c|}{(same as DP-2)} |

TABLE 3

| | \multicolumn{7}{c|}{Layered body or completely cured layered plate} |
| | Name of layered body/ completely cured layered plate | Number of semipregs/ uncured layered plates used | Press temperature | Press pressure | Press time | DMA measurement of cut resin part | State of layered body/layered plate |
|---|---|---|---|---|---|---|---|
| Comparative Example 1 | DP-1 (layered body) | 8 sheets (D1) | Room temperature | No pressure | Only stacked by hands | — | Easy to delaminate by only force applied by human hands |
| Example 1 | — | — | — | — | — | — | Impossible to delaminate by force applied by human hands |

TABLE 3-continued

| | Layered body or completely cured layered plate | | | | | | |
|---|---|---|---|---|---|---|---|
| | Name of layered body/ completely cured layered plate | Number of semipregs/ uncured layered plates used | Press temperature | Press pressure | Press time | DMA measurement of cut resin part | State of layered body/layered plate |
| Example 2 | — | — | — | — | — | — | Impossible to delaminate by force applied by human hands |
| Example 3 | — | — | — | — | — | — | Impossible to delaminate by force applied by human hands |
| Comparative Example 2 | DP-5 (Completely cured layered plate) | 1 plate (DP-2) | 288° C. => temperature increase (10° C./min) => 370° C. | slight pressure (288° C.) 10 MPa (288° C. => 370° C.) | 10 min (288° C., slight pressure) 90 min (288° C., 10 MPa) about 8 min (temperature increase, 10 MPa) 60 min (370° C., 10 MPa) | No peak of uncured component | Impossible to delaminate by force applied by human hands |

TABLE 4

| | Shear test piece | | | | |
|---|---|---|---|---|---|
| | Name of test piece | Number of layered bodies/ layered plates used | Use of adhesive | Operation to further stack layered bodies | Operation of correcting position before press |
| Comparative Example 1 | SP-1 | 2 | Not used | Very complicated | Very complicated |
| Example 1 | SP-2 | 2 | Not used | Simple | Simple |
| Example 2 | SP-3 | 2 | Not used | Simple | Simple |
| Example 3 | SP-4 | 2 | Not used | Simple | Simple |
| Comparative Example 2 | SP-5 | 2 | Used (P1 used) | Very complicated | Very complicated |

TABLE 5

| | Shear test piece | | |
|---|---|---|---|
| | Press temperature | Press pressure | Press time |
| Comparative Example 1 | 288° C. => temperature increase (10° C./min) => 370° C. | Slight pressure (288° C.) 10 MPa (288° C. => 370° C.) | 10 min (288° C., slight pressure) 90 min (288° C., 10 MPa) about 8 min (temperature increase, 10 MPa) 60 min (370° C., 10 MPa) |
| Example 1 | 288° C. => temperature increase (10° C./min) => 370° C. | Slight pressure (288° C.) 10 MPa (288° C. => 370° C.) | 10 min (288° C., slight pressure) 90 min (288° C., 10 MPa) about 8 min (temperature increase, 10 MPa) 60 min (370° C., 10 MPa) |
| Example 2 | 300° C. => temperature increase (10° C./min) => 370° C. | Slight pressure(300° C.) 10 MPa (300° C. => 370° C.) | 10 min (300° C., slight pressure) 90 min (300° C., 10 MPa) about 7 min (temperature increase, 10 MPa) 60 min (370° C., 10 MPa) |
| Example 3 | 330° C. => temperature increase (10° C./min) => 370° C. | Slight pressure (330° C.) 10 MPa (330° C. => 370° C.) | 10 min (330° C., slight pressure) 90 min (330° C., 10 MPa) about 4 min (temperature increase, 10 MPa) 60 min(370° C., 10 MPa) |
| Comparative Example 2 | 288° C. => temperature increase (10° C./min) => 370° C. | Slight pressure (288° C.) 10 MPa (288° C. => 370° C.) | 10 min (288° C., slight pressure) 90 min (288° C., 10 MPa) about 8 min (temperature increase, 10 MPa) 60 min (370° C., 10 MPa) |

TABLE 6

| | Shear test piece | | | |
|---|---|---|---|---|
| | DMA measurement of cut resin part | Easiness of test piece delamination | Shear bond strength | Shear fracture type |
| Comparative Example 1 | No peak of uncured component | Impossible to delaminate by force applied by human hands | 19.0 MPa | MF/CF |
| Example 1 | No peak of uncured component | Impossible to delaminate by force applied by human hands | 14.5 MPa | MF/CF |

TABLE 6-continued

| | Shear test piece | | | |
|---|---|---|---|---|
| | DMA measurement of cut resin part | Easiness of test piece delamination | Shear bond strength | Shear fracture type |
| Example 2 | No peak of uncured component | Impossible to delaminate by force applied by human hands | 15.0 MPa | MF/CF |
| Example 3 | No peak of uncured component | Impossible to delaminate by force applied by human hands | 7.8 MPa | AF |
| Comparative Example 2 | — | Impossible to delaminate by force applied by human hands | 11.5 MPa | MF/CF |

Consideration of Results

The shear bond strength of the shear test piece obtained in Comparative Example 1 was good. However, the layered bodies stacked on top of each other prior to heating and pressure application were easily detached from each other and even separated into the semipregs, which were components of each of the layered bodies. Accordingly, in fine positional adjustment for obtaining a molded article having a desired shape, the semipregs were easily displaced. This made the positioning very complicated. Therefore, it could not be said that the method of Comparative Example 1 was suitable for obtaining a large and thick molded article or a complex-form molded article. For example, in a process of obtaining a large and thick molded article by heating and pressure application, if pressure applied was even slightly uneven in an early stage, semipregs would be easily displaced relative to each other and this would cause the pressure to be more uneven. On this account, obtaining a desired molded article in such a process was considered to be difficult.

The shear bond strength of a molded article obtained in Comparative Example 2 was slightly inferior. Further, in a case where in order to obtain a molded article of a desired shape, if an attempt was made to finely position the two completely cured layered plates between which the terminally modified imide oligomer powder was sandwiched, the terminally modified imide oligomer powder would be easily unevenly distributed or dropped out. Therefore, such positioning was very complicated. Moreover, it could not be said that this method was suitable for obtaining a large and thick molded article or a complex-form molded article. For example, in a case where the bonding surface was not level, the terminally modified imide oligomer powder would be easily unevenly distributed or dropped out. Therefore, in such a case, obtaining a desired adhesion property was considered to be difficult.

Examples 1 to 3 are provided herein. For example, the uncured layered plates stacked on top of each other can be easily detached from each other by force applied by a human hand for repositioning, and adjusted again so as to be in a positional relation suitable for obtaining a desired molded article. In addition, since no adhesive is used, no adhesive is unevenly distributed or dropped out in principle. Further, the plurality of layers constituting the uncured layered plate are not displaced relative to each other. Therefore, it is clear that the methods of Examples 1 to 3 are suitable for obtaining a large and thick molded article and a complex-form molded article.

From a comparison between Example 3 and Examples 1 and 2, it is clear that whereas the shear bond strength is better in Examples 1 to 2 than in Example 3, Example 3 has a feature that no resin is found to protrude from the base material. In applications to usages where the shear bond strength is considered important, it is clear that a maximum processing temperature for obtaining an uncured layered plate is preferably not higher than 320° C. (on the premise that 90-minute heating and pressure application will be carried out; the same applies below), more preferably not higher than 315° C., even more preferably not higher than 310° C., and most preferably not higher than 305° C. In the applications to such usages, on the premise that heating and pressure application for a shorter period of time are to be carried out, it is possible to obtain a desired shear bond strength at a temperature higher than those described above. Therefore, in such a case, the maximum processing temperature can be adjusted as appropriate. On the other hand, in applications to usages where it is considered important that the resin protrudes less, it is clear that the maximum processing temperature for obtaining the uncured layered plate is preferably not lower than 295° C., more preferably not lower than 300° C., even more preferably not lower than 310° C., and most preferably not lower than 320° C. In the applications to such usages, on the premise that heating and pressure application for a shorter period of time are to be carried out, it is possible to reduce protrusion of the resin at a temperature higher than those described above Therefore, in such a case, the maximum processing temperature can be adjusted as appropriate.

INDUSTRIAL APPLICABILITY

Aspects of the present disclosure can be suitably used in a wide range of fields requiring easy moldability and high heat resistance. Such fields include the fields of aircraft and space industry devices, general industrial uses, and vehicle engine (peripheral) members.

Although the disclosure has been described with respect to only a limited number of embodiments, those skilled in the art, having benefit of this disclosure, will appreciate that various other embodiments may be devised without departing from the scope of one or more embodiments of the present disclosure. Accordingly, the scope of one or more embodiments should be limited only by the attached claims.

The invention claimed is:

1. An uncured layered plate comprises: a plurality of layers fused together, the plurality of layers each comprising reinforcement fibers and a powder of an imide oligomer represented by formula (1):

(1)

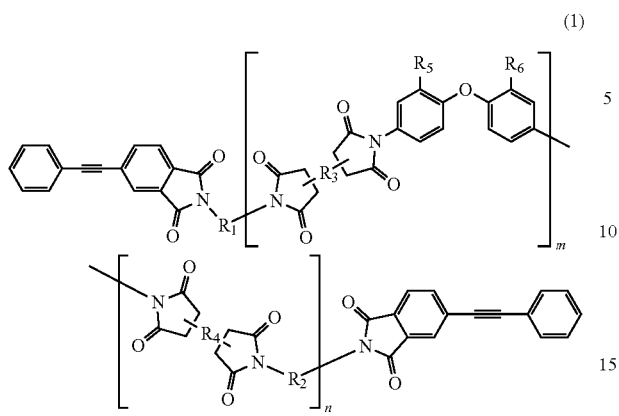

wherein:
R1 represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;
R2 represents a divalent residue of at least one aromatic diamine selected from 9,9-bis(4-aminophenyl)fluorene, 1,3-9,9-bis(4-(4-aminophenoxy)phenyl)fluorene, diaminobenzene, and 4-phenoxy-1,3-diaminobenzene;
R3 and R4, which are identical to each other or different from each other, each represents a tetravalent residue of an aromatic tetracarboxylic acid;
one of R5 and R6 represents a phenyl group, and the other one of R5 and R6 represents a hydrogen atom;
m and n satisfy the following:

1≤m,

0≤n≤5,

1≤m+n≤10, and 0.5≤ m/(m+n)≤ 1; and a sequence of repeating units may be a block sequence or a random sequence.

2. The uncured layered plate according to claim 1, wherein the imide oligomer is represented by formula (2):

(2)

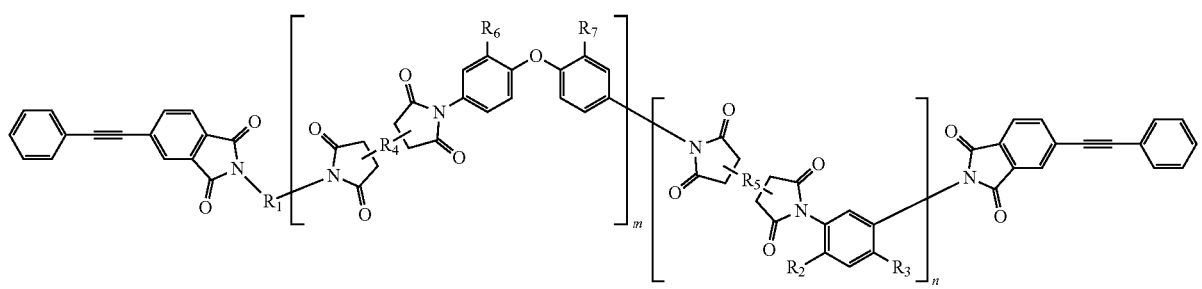

wherein:
R1 represents a divalent residue of an aromatic diamine selected from 2-phenyl-4,4'-diaminodiphenylether and 4-phenoxy-1,3-diaminobenzene;
one of R2 and R3 represents a phenoxy group, and the other one of R2 and R3 represents a hydrogen atom;

R4 and R5, which are identical to each other or different from each other, each represent a tetravalent residue of an aromatic tetracarboxylic acid;
one of R6 and R7 represents a phenyl group, and the other one of R6 and R7 represents a hydrogen atom;
m and n satisfy the following:

1≤m,

0≤n≤5,

1≤m+n≤10, and 0.5≤m/(m+n)≤1; and a sequence of repeating units may be a block sequence or a random sequence.

3. The uncured layered plate according to claim 1, wherein a volatile component is less than 20 wt % with respect to the imide oligomer.

4. A method for producing a reinforcing fiber composite material, the method comprising:
mixing the powder of the imide oligomer with reinforcement fibers to obtain each of the plurality of layers;
stacking the plurality of layers to form one layered plate; and
heat-curing at least two layered plates, at least one of the at least two layered plates is the uncured layered plate recited in claim 1.

5. The method according to claim 4, wherein the at least two layered plates include two or more uncured layered plates.

6. The method according to claim 4, wherein the at least two layered plates include at least the one uncured layered plate and at least one layered plate which is not the uncured layered plate.

7. The method according to claim 4, wherein heat-curing is carried out at a processing temperature (T4) of not lower than 340° C. and not higher than 400° C.

8. A method for producing an uncured layered plate, the method comprising:
mixing a powder of an imide oligomer with reinforcement fibers to obtain a layer;
stacking a plurality of the layers; and
heating at a temperature at which the plurality of the layers after stacking are fused together but are not completely cured.

9. The method according to claim 8, wherein heating is carried out at a temperature (T3) which is higher than a glass transition temperature (T1) of the imide oligomer and which is lower than a curing temperature (T2) of the imide oligomer.

10. The method according to claim 8, wherein the imide oligomer has a terminal capped with 4-phenylethynyl phthalic anhydride.

11. A method for producing a reinforcing fiber composite material, the method comprising:
(a) producing uncured layered plates each by (a-1) stacking a plurality of layers each of which is obtained by causing a powder of an imide oligomer to adhere to reinforcement fibers and then (a-2) heating at a temperature at which the plurality of layers fuse together but are not cured;
(b) obtaining a layered body by (b-1) stacking the uncured layered plates obtained in the step (a) and then (b-2) keeping the layered body at 260° C. to 340° C. and 0.1 MPa to 20 MPa for 5 minutes to 300 minutes; and
(c) further keeping the layered body at 330° C. to 500° C. and 0.1 MPa to 20 MPa for 15 minutes to 120 minutes.

12. The method according to claim 11, further comprising, before the step (a), opening a fiber bundle of the reinforcement fibers.

13. The method according to claim 11, wherein the imide oligomer is represented by formula (1):

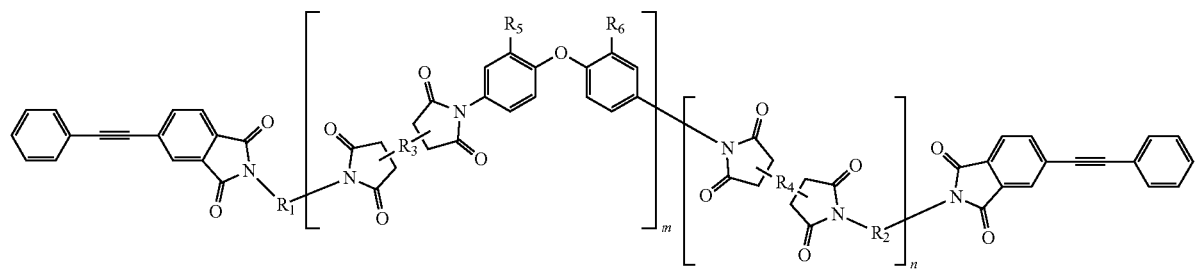

(1)

wherein:
$R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;
$R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;
$R_3$ and $R_4$, which are identical to each other or different from each other, each represent a tetravalent residue of an aromatic tetracarboxylic acid;
one of $R_5$ and $R_6$ represents a phenyl group, and the other one of $R_5$ and $R_6$ represents a hydrogen atom;
m and n satisfy the following:

$1 \leq m$, $0 \leq n \leq 5$, $1 \leq m+n \leq 10$, and $0.5 \leq m/(m+n) \leq 1$; and a sequence of repeating units may be a block sequence or a random sequence.

* * * * *